United States Patent
Reilly et al.

(10) Patent No.: US 7,714,623 B2
(45) Date of Patent: May 11, 2010

(54) AGILE HIGH RESOLUTION ARBITRARY WAVEFORM GENERATOR WITH JITTERLESS FREQUENCY STEPPING

(75) Inventors: Peter T. A. Reilly, Knoxville, TN (US); Hideya Koizumi, Oakridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 26 days.

(21) Appl. No.: 12/100,011

(22) Filed: Apr. 9, 2008

(65) Prior Publication Data
US 2009/0256640 A1   Oct. 15, 2009

(51) Int. Cl.
H03B 21/00   (2006.01)

(52) U.S. Cl. ............... 327/105; 327/106; 327/107; 331/1 A

(58) Field of Classification Search ......... 331/1 A; 327/105, 106, 107
See application file for complete search history.

(56) References Cited

U.S. PATENT DOCUMENTS

| | | | |
|---|---|---|---|
| 4,956,798 A | 9/1990 | Dinteman | |
| 5,258,937 A | 11/1993 | Blackmon | |
| 5,519,343 A | 5/1996 | Britz | |
| 5,554,987 A | 9/1996 | Ooga | |
| 5,600,320 A | 2/1997 | Wilson et al. | |
| 5,905,388 A | 5/1999 | Van Der Valk et al. | |
| 6,396,314 B1 * | 5/2002 | Roth | 327/107 |
| 6,619,343 B2 * | 9/2003 | Stoddart et al. | 141/286 |
| 6,753,706 B2 * | 6/2004 | Ho | 327/105 |
| 6,867,625 B1 * | 3/2005 | Stoyanov | 327/105 |
| 7,242,225 B2 | 7/2007 | Klage | |
| 2001/0022823 A1 * | 9/2001 | Renaud | 375/359 |
| 2005/0134330 A1 * | 6/2005 | Sullivan et al. | 327/105 |
| 2006/0009938 A1 * | 1/2006 | Roger et al. | 702/107 |
| 2006/0020865 A1 | 1/2006 | Dai et al. | |
| 2007/0046380 A1 * | 3/2007 | Iwasaki | 331/1 A |

FOREIGN PATENT DOCUMENTS

JP   07-063124   3/1995

OTHER PUBLICATIONS

Murphy, Eva et al., "All About Direct Digital Synthesis", Analgo Dialogue 38-08, Aug. 2004, pp. 1-5.

* cited by examiner

*Primary Examiner*—Arnold Kinkead
*Assistant Examiner*—Richard Tan
(74) *Attorney, Agent, or Firm*—Scully, Scott, Murphy & Presser, P.C.

(57) ABSTRACT

Jitterless transition of the programmable clock waveform is generated employing a set of two coupled direct digital synthesis (DDS) circuits. The first phase accumulator in the first DDS circuit runs at least one cycle of a common reference clock for the DDS circuits ahead of the second phase accumulator in the second DDS circuit. As a phase transition through the beginning of a phase cycle is detected from the first phase accumulator, a first phase offset word and a second phase offset word for the first and second phase accumulators are calculated and loaded into the first and second DDS circuits. The programmable clock waveform is employed as a clock input for the RAM address controller. A well defined jitterless transition in frequency of the arbitrary waveform is provided which coincides with the beginning of the phase cycle of the DDS output signal from the second DDS circuit.

39 Claims, 10 Drawing Sheets

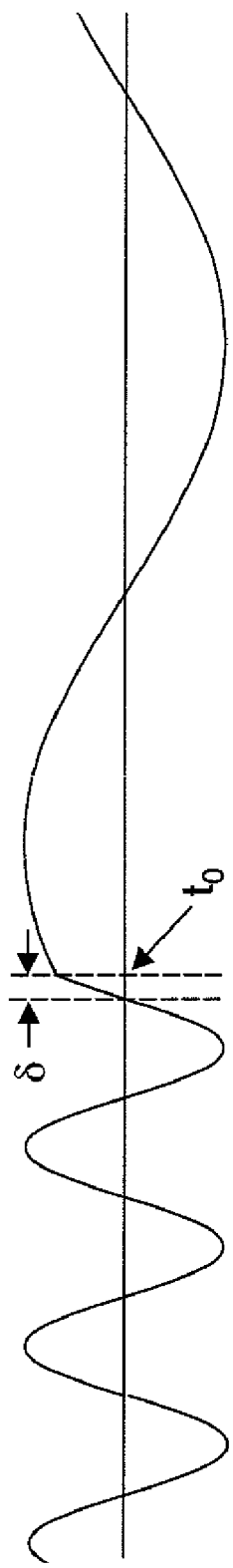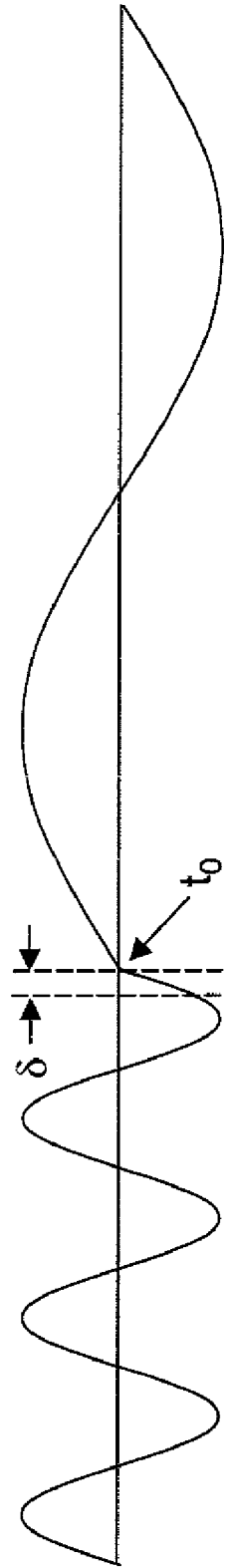

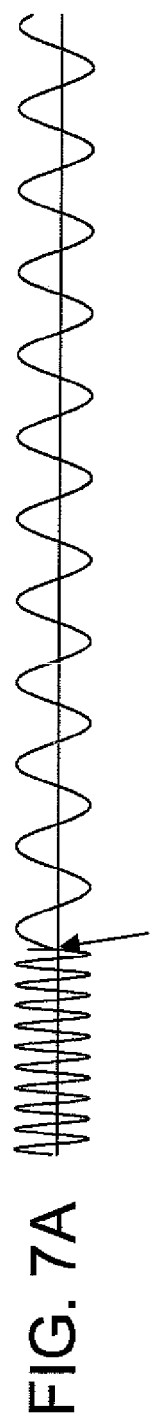
FIG. 7A
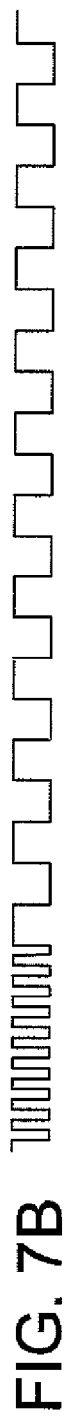
FIG. 7B
FIG. 7C
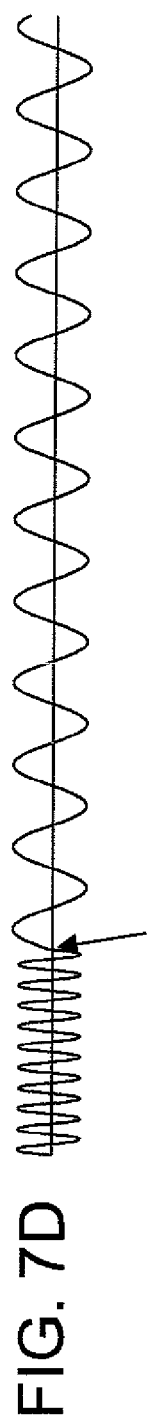
FIG. 7D
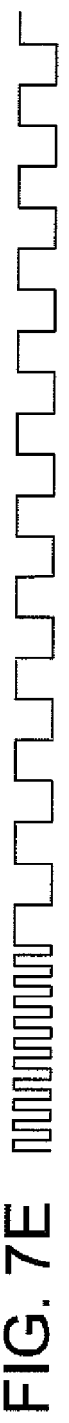
FIG. 7E
FIG. 7F

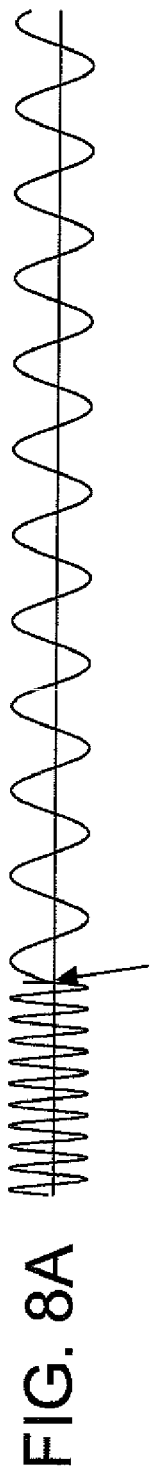
FIG. 8A
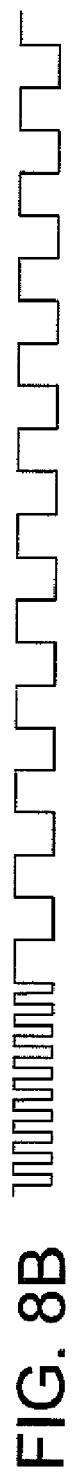
FIG. 8B
FIG. 8C
FIG. 8D
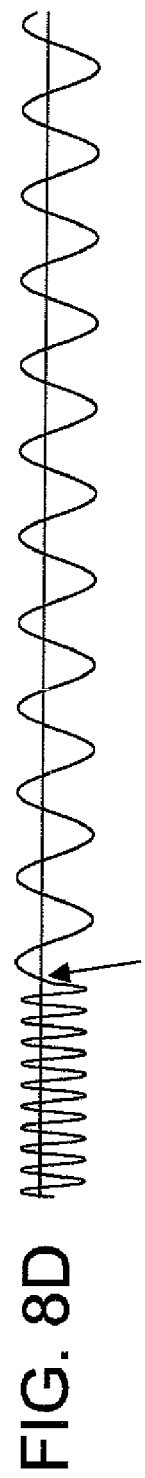
FIG. 8E
FIG. 8F

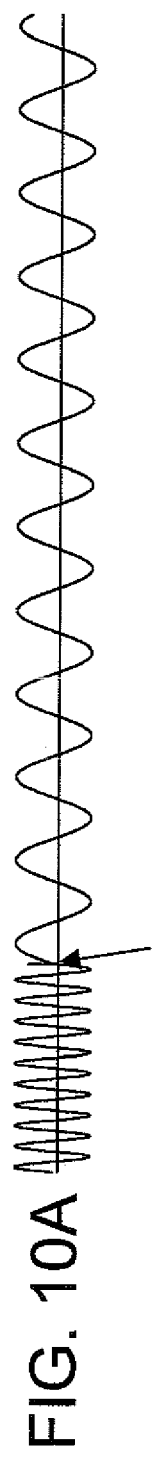
FIG. 10A
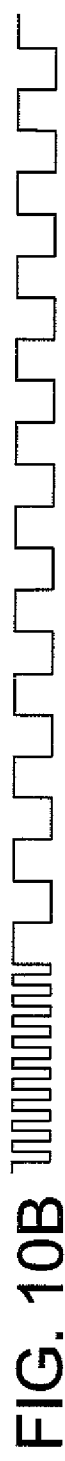
FIG. 10B
FIG. 10C
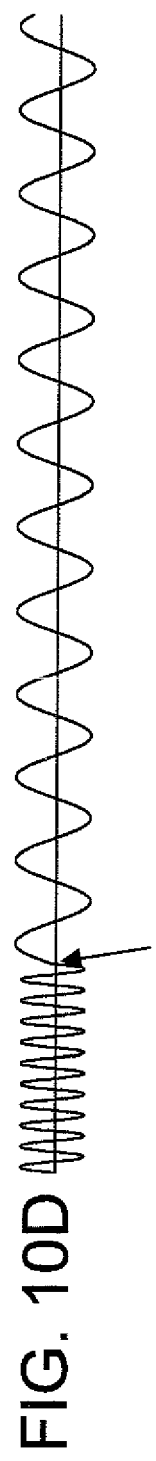
FIG. 10D
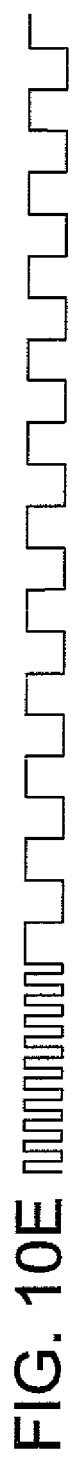
FIG. 10E
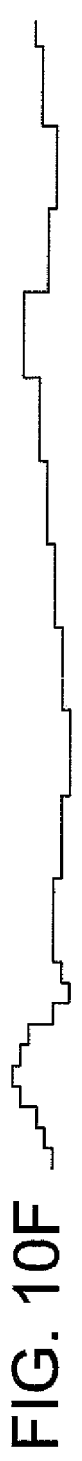
FIG. 10F

AGILE HIGH RESOLUTION ARBITRARY WAVEFORM GENERATOR WITH JITTERLESS FREQUENCY STEPPING

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in this invention.

FIELD OF THE INVENTION

The present invention relates to electronic devices and electronic circuits, and more particularly to a high frequency resolution arbitrary waveform generator providing jitterless frequency stepping, and circuits for the same and methods of operating the same.

BACKGROUND OF THE INVENTION

High resolution arbitrary waveform generators, which are also referred to as function generators, are employed in electronic applications to provide an arbitrary waveform in the frequency range above 1 MHz. Agile high resolution arbitrary waveform generators provide fast switching of arbitrary waveforms, which may be advantageously employed to provide frequency stepping in electronic instrumentation.

Direct Digital Synthesis (DDS) is a method of generating a high frequency electronic signal. DDS is typically employed in high frequency function generators. FIG. 1 illustrates an exemplary prior art waveform generation circuit comprising a phase accumulator, a waveform look-up table, a digital-to-analog converter (DAC), a signal filter, and a reference clock. Exemplary electronic signals at each node are also shown in FIG. 1. The phase accumulator and the waveform look-up table collectively constitute a DDS circuit that generates a high frequency digital signal that is subsequently converted to a high frequency analog signal.

Prior to operation of the prior art waveform generation circuit, the waveform look-up table is "programmed" by storing binary data for every combination of input data provided by the phase accumulator. The waveform look-up table is thus a programmable memory to which a DDS output waveform is written. Typically, the number B of output bits of the phase accumulator is from about 24 to about 48. Thus, $2^B$ values are possible for the output bits, or the "phase," of the phase accumulator.

A 24 to 48 bit "frequency tuning word" (an "FTO") defines the stepping, which is the increment, of the phase in a phase accumulator. The phase is accumulated at a fixed frequency defined by a reference clock. The phase accumulates linearly at each clock cycle at a predetermined increment, which is the frequency tuning word. Since there are only B bits in the programming step, the arithmetic governing the increment of the phase is modular arithmetic with modulo $2^B$, i.e., whenever the value of the phase exceeds $2^B$, the number $2^B$ is subtracted from the value so that the value of the phase remains between 0 and $2^B-1$.

The binary data corresponding to the input data provided by the phase accumulator is output as digital outputs from the waveform look-up table. The binary data stored in the waveform look-up table constitutes a table of amplitudes in digital format. When plotted as a function of the phase, which is the output of the phase accumulator that constitutes the input to the waveform look-up table, the $2^B$ values of the binary output comprises a complete waveform stored in the waveform look-up table. During the operation, every FTW-th value of the waveform look-up table, which corresponds to an increment in the phase by the frequency tuning word in the phase accumulator, is output from the waveform look-up table.

Since the contents of the waveform look-up table determines the shape of the waveform generated from the waveform look-up table, the shape of the waveform may be arbitrary. Thus, the waveform from the waveform look-up table is herein referred to as an "arbitrary waveform." For example, the waveform look-up table may be filled with data representing a complete sinusoidal wave over the $2^B$ phases. Alternately, if the first half of the waveform look-up table is filled with 1's and the second half of the waveform look-up table is filled with 0's, the waveform look-up table stores a 50% duty cycle square wave. In general any DDS output waveform may be stored.

The DDS output waveform frequency $f_{DDS}$ of the waveform from the waveform look-up table is thus the clock frequency $f_c$ times the value of the frequency tuning word divided by $2^B$, i.e., $f_{DDS}=f_c \times FTW/2^B$. The number, $2^B$ needs not be a multiple of the frequency tuning word. For example, if the number of B is 36, the clock frequency is 100 MHz, and the frequency tuning word is 268,435,456 ($=2^{28}$), the DDS output waveform frequency $f_{DDS}$ is 100 MHz$\times 2^{28}/2^{36} \cong 391$ kHz. To generate a higher frequency, the frequency tuning word is increased so that the phase increases more with each clock cycle. In the above example, if the frequency tuning word is changed to 4,294,967,296 ($=2^{32}$), the DDS output waveform frequency is changed to 100 MHz$\times 2^{32}/2^{36}=6.25$ MHz.

The limitation on the highest frequency that may be generated by DDS depends on the clock frequency and the complexity of the waveform stored in the waveform look-up table. The lower the DDS output waveform frequency $f_{DDS}$, the higher the fidelity of the waveform generated by DDS. To generate a reasonable representation of the waveform stored in the waveform look-up table, a minimum number of output data needs to be sampled from the waveform look-up table, i.e., the number, $2^B/FTW$ needs to be a reasonably large number, which is typically greater than 10. The smaller the number, $2^B/FTW$, the less sampling available for generation of the output waveform, and the greater the distortion of the output signal.

This output from the waveform look-up table is then input to the digital-to-analog converter (DAC). The DAC converts the digital output of the waveform look-up table into an analog signal. The analog signal is then passed through a filter that removes high frequency components to yield a smooth waveform, of which the frequency and resolution is defined by the stepping of the phase rather than the reference clock frequency.

The switching of the frequency of the DDS can occur once the update signal is issued provided that the necessary instruction set is loaded at that point of time. Once the update is issued, the DDS produces a phase continuous frequency change in sine wave with certain pipeline delay. Switching of the frequency by changing the stepping of the phase can happen at any point in the phase accumulation and yield very different waveforms during the transition. Such transitions at arbitrary phases of the phase accumulator are illustrated in FIGS. 2A-2C. Reduction of frequency by a factor of 5 is employed for FIGS. 2A-2C.

Consequently the initial output waveforms and their periods during frequency jumping may be quite different from those that follow at the new frequency. The randomness of the frequency transition waveform frequency transition is referred to as frequency jitter. This problem has limited the usefulness of the DDS technology because the output waveform is not always precisely defined.

In view of the above, there exists a need to provide a function generator and an electronic circuit in which frequency changes in an output signal occur at a predetermined phase of an arbitrary waveform stored in a waveform look-up table.

Particularly, there exists a need to provide a function generator and an electronic circuit in which the frequency changes in the output signal occur at the beginning of the phase of the arbitrary waveform stored in the waveform look-up table.

SUMMARY OF THE INVENTION

To address the needs described above, the present invention provides a waveform generator in which the output signal changes frequency only at a beginning phase of an arbitrary waveform so that each waveform has a well defined frequency and jitter in signal frequency is minimized, circuits for the same, and methods of operating the same.

In the present invention, the frequency tuning word for a set of two coupled direct digital synthesis (DDS) circuits, which determines the frequency of a programmable input clock for a random access memory (RAM) address controller, is changed only at the beginning of an arbitrary waveform stored in a random access memory (RAM) and accessed by a RAM address controller so that there is no jitter in the frequency transition. All of the characteristics of the arbitrary waveform are defined by the contents of the RAM corresponding to the outputs of the RAM address controller. The innovation is in the production of the jitterless transition of the programmable clock waveform generated employing the set of two coupled direct digital synthesis circuits.

The first phase accumulator in the first DDS circuit runs at least one cycle of a common reference clock for the DDS circuits ahead of the second phase accumulator in the second DDS circuit. As a phase transition through the beginning of a phase cycle is detected from the first phase accumulator, a first phase offset word and a second phase offset word for the first and second phase accumulators are calculated and loaded into the first and second DDS circuits. The phases of the first phase accumulator and the second phase accumulator are offset by the same number of cycles of the common reference clock at the new frequency, which is determined by a frequency tuning word loaded into the first and second phase accumulators concurrently with the loading of the first and second phase offset words. Thus, DDS output waveform from the second DDS circuit is further processed to generate the programmable clock waveform employing a high speed comparator. The programmable clock waveform is employed as a clock input for the RAM address controller. The frequency jitter of the clock input may be less than 25 ps and the resolution in the change of the period of the arbitrary waveform thus generated may be in sub-picosecond ranges.

The present invention advantageously employs the capability of DDS circuits to generate a programmable input clock capable of providing 48-bit frequency step resolution and MHz range switching or stepping. The primary difficulty of employing a DDS output signal as a programmable input clock for generation of an arbitrary waveform output in providing a precise and well defined transition of the frequencies in the prior art is addressed by employing the set of two DDS circuits so that the transition of frequency in the DDS output signal from the second DDS circuit of the present invention always coincides with the beginning of a phase cycle of the DDS output signal. This frequency transition also coincides with the beginning of the counting cycle of the RAM address controller. The result is a well defined jitterless transition in frequency of the arbitrary waveform that coincides with the beginning of the phase cycle of the DDS output signal from the second DDS circuit.

According to the present invention, a waveform generator is provided, which comprises:

a first direct digital synthesis (DDS) circuit including a first phase accumulator and a first waveform look-up table that generates a frequency-tunable first DDS output based on a first phase output from the first phase accumulator; and a second direct digital synthesis circuit including a second phase accumulator and a second waveform look-up table that generates a frequency-tunable second DDS output signal based on a second phase output from the second phase accumulator, wherein the frequency-tunable second DDS output signal has the same frequency as the frequency-tunable first DDS output signal, wherein the first waveform look-up table and the second waveform look-up table have same data contents, wherein the first phase output has a first phase in modulo counting based on a modulus and the second phase has a second phase in modulo counting based on the modulus, and wherein the first phase is ahead of the second phase by positive integer times a frequency tuning word that is commonly employed by the first phase accumulator and the second phase accumulator.

In one embodiment, the waveform generator further comprises:

a first state machine providing a frequency tuning word input and a first phase offset word input to the first phase accumulator at a frequency transition of the frequency-tunable first DDS output signal; and a second state machine providing the frequency tuning word input and a second phase offset word input to the second phase accumulator at a frequency transition of the frequency-tunable second DDS output signal.

In another embodiment, the waveform generator further comprises a programmable gate that generates a phase translation trigger pulse signal at the frequency transition of the frequency-tunable first DDS output signal.

In even another embodiment, a difference between the first phase and the second phase and a signal delay time between the first phase output and the phase translation trigger pulse signal are tuned so that a difference between the modulus and the second phase is less than a value of the frequency tuning word when the phase translation trigger pulse signal is routed to the second state machine.

In yet another embodiment, the waveform generator further comprises a random address memory (RAM) address controller generating a cyclical output of RAM addresses.

In still another embodiment, the frequency-tunable first DDS output signal and the frequency-tunable first DDS output signal are sinusoidal signals.

In a further embodiment, the waveform generator further comprises a field programmable gate array (FPGA), wherein the FPGA comprises:

a first state machine providing a frequency tuning word input and a first phase offset word input to the first phase accumulator at a frequency transition of the frequency-tunable first DDS output signal; and a second state machine providing the frequency tuning word input and a second phase offset word input to the second phase accumulator at a frequency transition of the frequency-tunable second DDS output signal.

According to another aspect of the present invention, a variable clock digital-to-analog conversion circuit is provided, which comprises:

a first direct digital synthesis (DDS) circuit comprising a first phase accumulator and a first waveform look-up table that generates a frequency-tunable first DDS output based on a first phase output from said first phase accumulator and;

a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;

a variable clock circuit that receives said frequency-tunable second DDS output signal and generates a square waveform output having the same frequency as said frequency-tunable second DDS output signal;

a digital output generator that generates a digital output signal; and a variable clock digital-to-analog converter receiving said square waveform output as a clock input signal and said digital output signal as data input signal and generating an analog output at a frequency of said square waveform output.

BRIEF DESCRIPTION OF THE DRAWINGS

FIG. 4A illustrates an exemplary first filtered analog output signal at node A of FIG. 3 around a frequency transition at $t_0$, and FIG. 4B illustrates an exemplary second filtered analog output signal at node D of FIG. 3 around the frequency transition at $t_0$.

FIGS. 7A, 7B, 7C, 7D, 7E, and 7F are a first set of exemplary signals at nodes A, B, C, D, E, and F, respectively, in the exemplary waveform generation circuit of FIG. 3. FIGS. 7A, 7B, 7C, 7D, 7E, and 7F are vertically aligned for time, i.e., the same value on the x-axis corresponds to the same time.

FIGS. 8A, 8B, 8C, 8D, 8E, and 8F are a second set of exemplary signals at nodes A, B, C, D, E, and F, respectively, in the exemplary waveform generation circuit of FIG. 3. FIGS. 8A, 8B, 8C, 8D, 8E, and 8F are vertically aligned for time, i.e., the same value on the x-axis corresponds to the same time.

FIGS. 10A, 10B, 10C, 10D, 10E, and 10F are a third set of exemplary signals at nodes A, B, C, D, E, and F', respectively, in the exemplary variable clock digital-to-analog conversion circuit of FIG. 9. FIGS. 10A, 10B, 10C, 10D, 10E, and 10F are vertically aligned for time, i.e., the same value on the x-axis corresponds to the same time.

DETAILED DESCRIPTION OF THE INVENTION

As stated above, the present invention relates to a high frequency resolution arbitrary waveform generator providing jitterless frequency stepping, and circuits for the same and methods of operating the same, which are now described in detail with accompanying figures.

Figure 3:
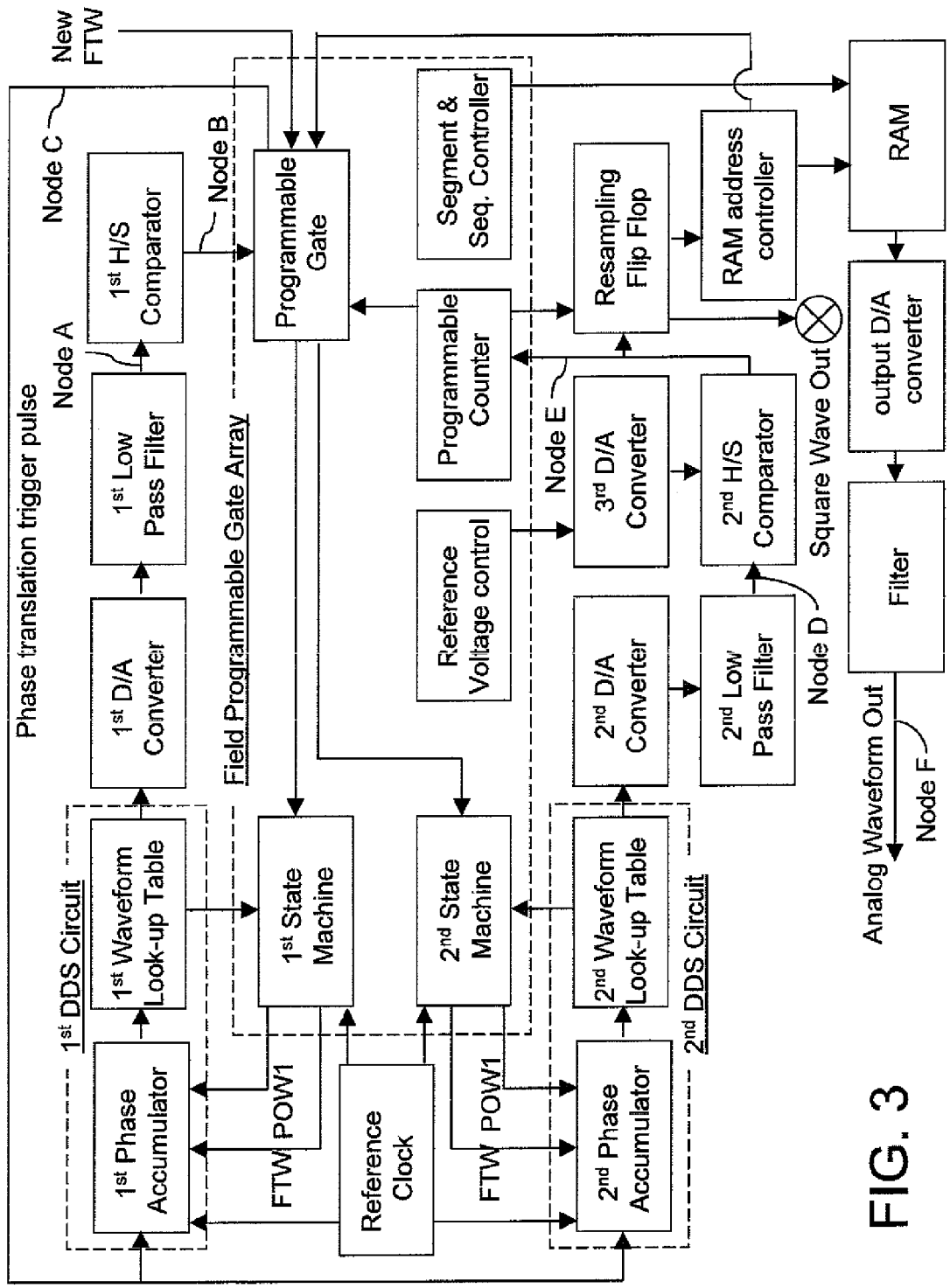
FIG. 3 is a circuit schematic for an exemplary waveform generation circuit for a waveform generator according to an embodiment of the present invention. The exemplary waveform generation circuit includes, among others, a first direct digital synthesis (DDS) circuit, a second DDS circuit, and a field programmable gate array (FPGA) as well as a random access memory (RAM) storing an arbitrary waveform and a RAM address controller.

Referring to FIG. 3, an exemplary waveform generation circuit for a waveform generator according to the present invention comprises a first direct digital synthesis (DDS) circuit, a second DDS circuit, a field programmable gate array (FPGA), a random access memory (RAM) storing an arbitrary waveform, and a RAM address controller.

The first DDS circuit includes a first phase accumulator and a first waveform look-up table, which outputs a first digital output signal based on a first phase output from the first phase accumulator. The first digital output signal is herein refereed to as a frequency-tunable first DDS output signal, which is the output signal of the first DDS circuit. Likewise, the second DDS circuit includes a first phase accumulator and a second waveform look-up table, which outputs a second digital output signal based on a second phase output from the second phase accumulator. The second digital output signal is herein refereed to as a frequency-tunable second DDS output signal, which is the output signal of the second DDS circuit. The frequency-tunable second DDS output signal has the same frequency and waveform as the frequency-tunable first DDS output signal. The first phase output has a first phase in modulo counting based on a modulus and the second phase has a second phase in modulo counting based on the modulus. However, the first DDS circuit and the second DDS circuit operate phase shifted with respect to each other so that the first digital output signal is ahead of the second digital output signal by a positive integer, i, of reference clock cycles.

Maintenance of the same frequency and waveform between the first DDS circuit and the second DDS circuit is effected by providing two sets of hardware having identical functionality for first DDS circuit and the second DDS circuit. Specifically, the first phase accumulator and the second accumulator perform the same type of modulo counting based on a modulus, m. In other words, the phase of first phase accumulator and the phase of the second accumulator are represented by integers ranging from 0 to m−1, corresponding to modulo counting based on the same modulus, m. The first phase output Φ1, which represents the phase of the first accumulator, and second phase output Φ1, which is the phase of the second accumulator, may also be represented by a first phase angle, $\phi_1$ and a second phase angle, $\phi_2$, respectively. The first phase angle $\phi_1$ and the second phase angle $\phi_2$ are given by the formulae:

$$\phi_1 = 2\pi \times \frac{\Phi 1}{m}; \quad \text{(Equation 1.a)}$$

$$\phi_2 = 2\pi \times \frac{\Phi 2}{m}. \quad \text{(Equation 1.b)}$$

The first phase accumulator and the second accumulator operate with the same reference clock and the same frequency tuning word, FTW, which determine the frequency of the frequency-tunable DDS output signal. Specifically, the frequency of the frequency-tunable first DDS output signal is the product of the frequency of the reference clock and the numeric value NFTW of the frequency tuning word divided by the modulus, m. The frequency of the frequency-tunable second DDS output signal frequency is the same as the frequency of the frequency-tunable first DDS output signal. The numeric value NFTW of the frequency tuning word, FTW, also determines the increment of the first phase output and the second phase output with each clock cycle. The phase increment of the first phase output and the second phase output are thus the same.

Since the first DDS circuit and the second DDS circuit operate phase shifted with respect to each other so that the first digital output signal is ahead of the second digital output signal by the positive integer, i, of reference clock cycles, and the phase increment of each of the first and second phase accumulators is the same as the value of the frequency tuning word, FTW, the phase difference Δ between the first phase Φ1 and the second phase Φ2 is given by:

$$\Delta = [NFTW \times i] (\text{mod } m), \quad \text{(Equation 2)}$$

wherein NFTW is a numeric value of the frequency tuning word, FTW, and (mod m) represents a modularization operation on the preceding number [NFTW×i]. The phase difference angle δ between the first phase angle, $\phi_1$ and the second phase angle, $\phi_2$, is given by:

$$\delta = 2\pi \times \frac{[NFTW \times i](\text{mod } m)}{m}. \quad \text{(Equation 3)}$$

Further, the first waveform look-up table and the second waveform look-up table provide identical functionality. The first waveform look-up table and the second waveform look-up table have identical contents, i.e., stored data, have the same addressing scheme for the stored data, and provide the same output if the same address is provided to access their contents. Preferably, the first waveform look-up table and the second waveform look-up table store a single complete cycle of a sinusoidal waveform. In this case, the frequency-tunable first DDS output signal and the frequency-tunable second DDS output signal are sinusoidal signals.

The positive integer, i, is typically a single digit number, i.e., 1-9, and more typically a low single digit number, i.e., 1-4. The positive integer, i, may be 1. The positive integer, i, is selected such that the exemplary waveform generation circuit may be able to provide an updated first phase offset word and an updated second phase offset word that accompanies an updated frequency tuning word for the updated frequency of the frequency-tunable first DDS output signal and the frequency-tunable second DDS output signal. If the exemplary waveform generation circuit may provide such calculations fast enough within one cycle of the reference clock, the positive integer, i, is preferably set at 1. If more than one reference clock cycle is needed to provide the updated first phase offset word and the updated second phase offset word, the positive integer, i, may be set at a number that allow enough time for the exemplary waveform generation circuit to generate the updated first phase offset word and the updated second phase offset word.

The updated second phase offset word is calculated by adding a numeric value of the updated frequency tuning word to the last known value of the second phase output in modulo addition based on modulus m. The updated first phase offset word is calculated such that the new phase difference Δ' between the first phase offset word and the second phase offset word is given by:

$$\Delta' = [NFTW' \times i](\text{mod } m), \quad \text{(Equation 4)}$$

wherein NFTW' is the numeric value of the new frequency tuning word.

Practically, the modulus, m, of the modulus counting in the first and second phase accumulators is effected by employing a binary counter having B number of bits and performing an addition of 1 at each cycle of the reference clock. Since each bit provides two choices, the total number of available states, which is the modulus, m, of the modulus counting is $2^B$, corresponding to all available binary states of the binary counter. B may be any positive integer. Practically, B is an integer greater than 31, i.e., an integer equal to 32 or greater than 32. Typically, B is an integer between 31 and 49, e.g., 32, 48, etc., although implementation of the present invention with B greater than 48, as technology enables higher reference clock speed and more calculations per unit time, is explicitly contemplated herein.

The first DDS circuit outputs the frequency-tunable first DDS output signal, which is herein referred to as a "first digital output signal." The first digital output signal is transmitted to a first digital-to-analog converter (DAC), which converts the first digital output signal into a first analog output signal. Typically, the number of input bits for the first DAC is an integer between 10 and 24, and typically about 14, although lesser and greater numbers for the input bits are contemplated herein also. Since the first digital output signal typically has more number of bits, e.g., 48 bits, than the input bits for the first DAC, e.g., 14 bits, the lower bits in the first digital output signal may be truncated, resulting in a spurious noise in an output signal. Such spurious noise may be minimized, however, by employing a large number of clock cycles within the period of an arbitrary waveform to be generated from the inventive circuit. The first analog output signal passes through a first low pass filter to remove high frequency noises. The signal that is output from the first low pass filter is herein referred to as a first filtered analog output signal. The first filtered analog output signal is then transmitted to a first high speed comparator. The output node of the first low pass filter, which is also the input node of the first high speed comparator, is herein designated as "node A."

The first high speed comparator converts the first filtered analog output signal into a binary output that depends on the sign of the first filtered analog output. In other words, the first high speed comparator compares the first filtered analog output signal with a reference voltage, which is zero, and generates an output signal depending on the results of the comparison such that one voltage, e.g., a voltage corresponding to "1," is output when the sign of the first filtered analog output signal is positive and another voltage, e.g., a voltage corresponding to "0," is output when the sign of the first filtered analog output signal is negative. Thus, the output of the first high speed comparator is a binary output, i.e., an output having two states. Temporal extension of the binary output over a period of time constitutes a square waveform. The output from the first high speed comparator is herein referred to as a first square waveform output.

If the first filtered analog output signal is a sinusoidal wave, the output of the first high speed comparator is a square wave with 50% duty cycle. The output node of The first high speed comparator is herein designated as "node B." The rising edge of the square wave from the first high speed comparator correlates with detection of a positive transition of a sinusoidal waveform in the frequency-tunable first DDS output through the zero phase by the first high speed comparator. In other words, the rising edge of the square wave from the first high speed comparator correlates with the change of sign in the signal at node A from negative to positive as detected by the first high speed comparator.

The first square wave output of the first high speed comparator is transmitted to a programmable gate. The programmable gate generates a phase translation trigger pulse signal from the square wave output signal from the first high speed comparator and various logic control signals provided to the programmable gate. The phase translation trigger pulse signal triggers loading of a new frequency tuning word to the first phase accumulator and the second phase accumulator. In other words, the phase translation trigger pulse signal is used for trigger the frequency change of the first DDS circuit and the second DDS circuit.

Preferably, the programmable gate is provided with a new frequency tuning word input node to which a new frequency tuning word is transmitted. The generation of the phase translation trigger pulse signal is enabled only when the new frequency tuning word and the new frequency tuning word is different from the frequency tuning word, FTW, which is currently loaded onto the first phase accumulator and the second phase accumulator. Thus, the phase translation trigger pulse signal is generated only when an indication of an impending frequency is communicated to the programmable gate by transmission of the new frequency tuning word to the new frequency tuning word input node of the programmable gate. The signal node that transmits the phase translation trigger pulse signal, which is an output node of the programmable gate, is herein designated as "node C."

Preferably, generation of the phase translation trigger pulse signal is further controlled by another enabling signal from a programmable counter, which counts cycles of the frequency-tunable second DDS output signal for generation of an arbitrary waveform to be described below, so that the phase translation trigger pulse signal may be generated only during a predetermined step of the counting cycle of the programmable counter. Typically, the step of the counting cycle of the programmable counter that enables the generation of the phase translation trigger pulse signal is the last step of the counting cycle, which corresponds to the last part of the arbitrary signal immediately before reverting to the beginning of the arbitrary signal so that a full cycle of the arbitrary waveform at an old arbitrary waveform frequency is completed before starting a new cycle of the arbitrary waveform is started at a new arbitrary waveform frequency.

The phase translation trigger pulse signal is routed to the first phase accumulator, the second phase accumulator, a first state machine, and a second state machine to trigger loading of a new set of data including the new frequency tuning word, a new first phase output, and a new second phase output onto the first phase accumulator and the second phase accumulator. The phase translation trigger pulse signal triggers a frequency transition of the frequency-tunable first DDS output signal. The phase translation trigger pulse signal also triggers another concurrent frequency transition of the frequency-tunable second DDS output signal. Thus, the occurrence of the phase translation trigger pulse signal is simultaneous with the frequency transitions in the frequency-tunable first DDS output signal and the frequency-tunable second DDS output signal. The first state machine and the second state machine are configured to provide the frequency transition of the frequency-tunable first DDS output signal and the frequency transition of the frequency-tunable second DDS output signal simultaneously.

Specifically, the new frequency tuning word is transmitted from the programmable gate to the first state machine and the second state machine. A frequency tuning word input, which has the same numeric value as the new frequency tuning word, is prepared for loading into the first phase accumulator and the second phase accumulator in the first state machine and the second state machine, respectively. The frequency tuning word input has a numeric value equal to a product of a new frequency for the frequency-tunable first DDS output signal and the modulus, m, divided by a reference clock frequency applied to the first DDS circuit and the second DDS circuit.

Upon the occurrence of the phase translation trigger pulse signal, the frequency tuning word input is loaded to the first phase accumulator and the second phase accumulator as an input signal. The frequency tuning word input overwrites the prior frequency tuning word on the first phase accumulator and the second phase accumulator. At the same time, the first phase offset word input is loaded into the first phase accumulator to overwrite any calculated value for the first phase output to become the new first phase output to be transmitted to the first waveform look-up table. The second phase offset word input is loaded into the second phase accumulator to overwrite any calculated value for the second phase output to become the new second phase output to be transmitted to the second waveform look-up table.

Figure 1:
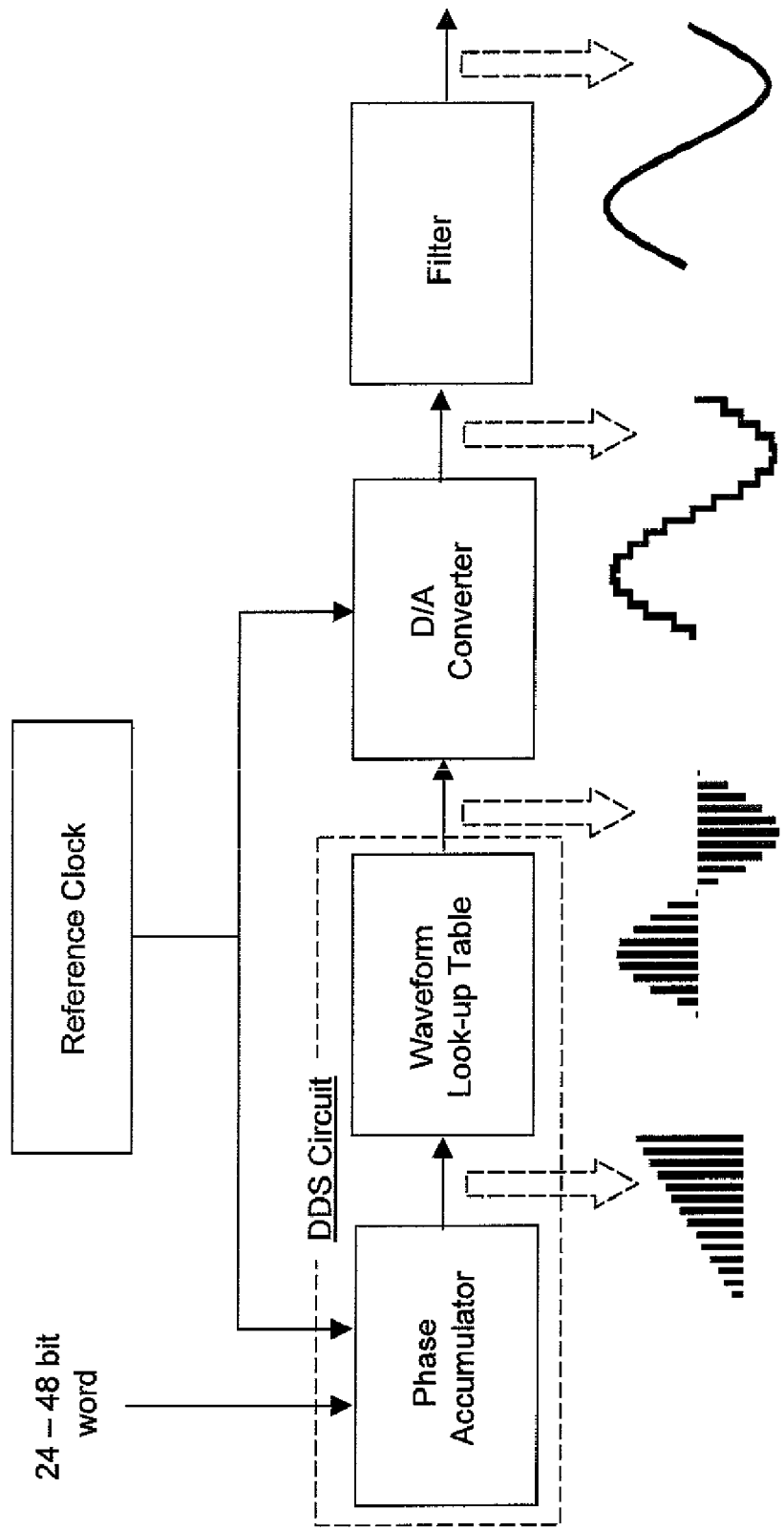
FIG. 1 is a circuit schematic for an exemplary prior art waveform generation circuit comprising a phase accumulator, a waveform look-up table, a digital-to-analog converter (DAC), a signal filter, and a reference clock.
Figure 2A:
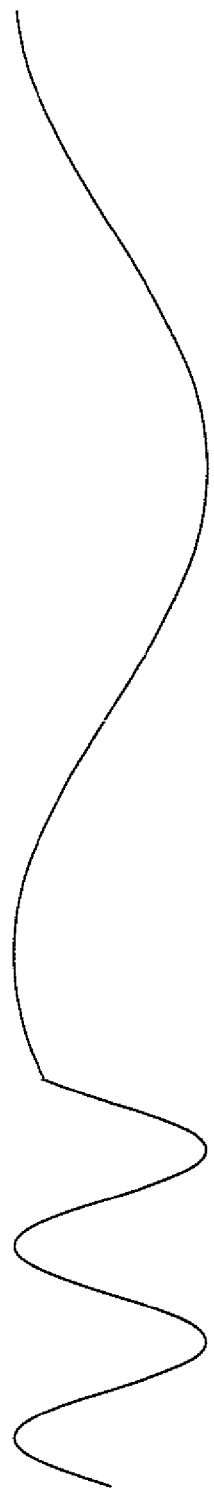
FIGS. 2A, 2B, and 2C are exemplary waveforms from the exemplary prior art waveform generation circuit at a frequency transition.
Figure 2B:
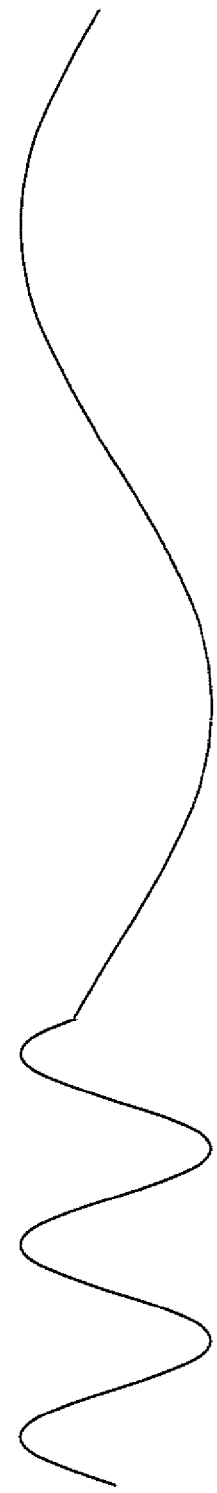
Figure 2C:
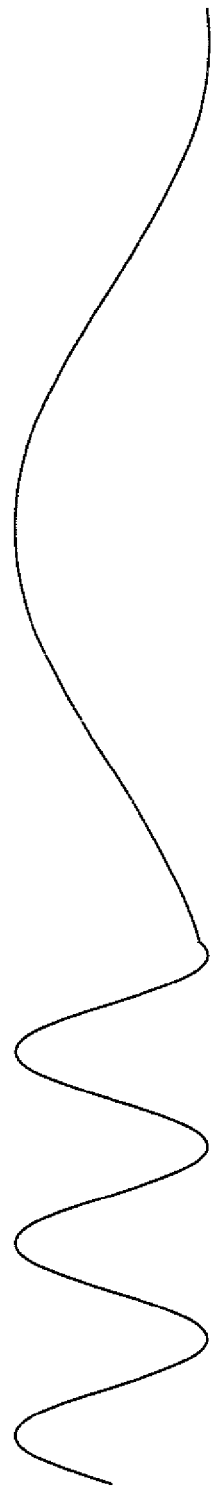

For change of the frequency for the frequency-tunable first DDS output signal and the frequency-tunable second DDS output signal is desired, the new frequency tuning word replaces the old frequency tuning word in the first phase accumulator and the second phase accumulator. The new frequency tuning word is provided to the first phase accumulator and the second phase accumulator as the frequency tuning word input from the first state machine and the second state machine, respectively. It is noted herein that if loading of the new frequency tuning word through the frequency tuning word input is permitted at any time, the frequency-tunable first DDS output signal and the frequency-tunable second DDS output signal would make a frequency transition at an arbitrary phase as shown in FIGS. 2A-2C in the same manner as in prior art DDS circuits.

According to the present invention, however, timing of such a frequency transition is controlled by the phase translation trigger pulse generated from the programmable gate. Further, the phase difference between the first phase output and the second phase output is maintained such that generation of the phase translation trigger pulse occurs at the cycle of the reference clock immediately before second phase output of the second phase accumulator is about to reset to a number close to zero upon exceeding the modulus, m, i.e., immediately before the second phase angle $\phi_2$, as measured in radian with modulus $2\pi$, is about to pass 0. The phase difference is an integer multiple of the numeric value of the frequency tuning word loaded onto the first phase accumulator and the second phase accumulator, i.e., the product of the positive integer, i, and the numeric value of the frequency tuning word. The phase difference angle is obtained by multiplying $2\pi/m$ to the phase difference. The frequency-tunable second DDS output signal changes frequency immediately before crossing over the phase angle of zero. In other words, the frequency transition correlates with the last value of the second phase angle prior to an immediately impending roll over through zero.

The difference between the first phase, which is the phase of the first phase output in modulo counting based on modulus m, and the second phase, which is the phase of the second phase output in modulo counting based on modulus m, and the signal delay time between the first phase output and the phase translation trigger pulse signal are set so that a difference between the modulus, m, and the second phase is less than a value of the frequency tuning word when the phase translation trigger pulse signal is routed to the second state machine. Thus, the clock cycle at which the phase translation trigger pulse signal arrives at the second DDS circuit is one clock cycle before the second phase would pass the value of 0 if the phase translation trigger pulse signal were not to arrive at the second DDS circuit.

The first state machine provides the frequency tuning word input and the first phase offset word input to the first phase accumulator at a frequency transition of the frequency-tunable first DDS output signal. The second state machine provides the frequency tuning word input and the second phase offset word input to the second phase accumulator at the frequency transition of the frequency-tunable second DDS output signal, which occurs simultaneously with the frequency transition of the frequency-tunable first DDS output signal. The reference clock, which provides a reference clock signal to the first phase accumulator and the second phase accumulator, also provides a clock signal to the first state machine and the second state machine to synchronize the two frequency transitions in the first and second DDS circuits.

The second DDS circuit outputs the frequency-tunable second DDS output signal, which is herein referred to as a "second digital output signal." The second digital output signal is transmitted to a second digital-to-analog converter (DAC), which converts the second digital output signal into a second analog output signal. Typically, the number of input bits for the second DAC is an integer between 10 and 24, and typically about 14, although lesser and greater numbers for the input bits are contemplated herein also. Since the second digital output signal typically has more number of bits, e.g., 48 bits, than the input bits for the second DAC, e.g., 14 bits, the lower bits in the second digital output signal may be truncated, resulting in a spurious noise in an output signal. Such spurious noise may be minimized, however, by employing a large number of clock cycles within the period of an arbitrary waveform to be generated from the inventive circuit. The second analog output signal passes through a second low pass filter to remove high frequency noises. The signal that is output from the second low pass filter is herein referred to as a second filtered analog output signal. The second filtered analog output signal is then transmitted to a second high speed comparator. The output node of the second low pass filter, which is also the input node of the second high speed comparator, is herein designated as "node D."

FIGS. 4A and 4B compare an exemplary first filtered analog output signal at node A and a corresponding exemplary second filtered analog output signal at node D. Specifically, FIG. 4A shows the exemplary first filtered analog output signal at node A around a frequency transition at a frequency transition time, $t_0$, and FIG. 4B shows the exemplary second filtered analog output signal at node D around the same frequency transition at the frequency transition time $t_0$. The two frequency transitions occur concurrently. However, since the analog frequency-tunable first DDS output signal runs ahead of the analog frequency-tunable second DDS output by a phase difference angle $\delta$, the first phase angle of the analog frequency-tunable first DDS output at the frequency transition time to is greater than the second phase angle of the analog frequency-tunable first DDS output at the frequency transition time $t_0$ by the phase difference angle $\delta$.

The phase difference between the first phase output and the second phase output is set so that a rising edge of the phase translation trigger pulse at node C coincides with the last reference clock cycle of the second DDS circuit before the second phase output rolls over across zero. In modulo counting, the difference between the modulus, m, and the second phase output is less than the phase increment, which is the numeric value of the frequency tuning word, FTW. In terms of phase angles, the difference between the phase angle $2\pi$, which is the same as zero, and the second phase angle is less than the phase angle increment to be obtained by the second phase accumulator in the next reference clock cycle. The rising edge of the phase translation trigger pulse at node C substantially temporally coincides with a rising edge of the square wave signal at node B.

By triggering the frequency transition of the first DDS circuit and the second DDS circuit with the leading edge of the phase translation trigger pulse, which is generated based on detection of passing of the first phase angle through zero by the first high speed comparator, the stepping of the first phase accumulator and the second phase accumulator may be changed simultaneously with the passing of the second phase angle through zero for the second DDS circuit. The first and second phase accumulators are reset at the frequency transition by loading of the frequency tuning word input, the first phase offset word input, and the second phase offset word input to the first and second phase accumulators. The triggering of the frequency switch will occur on a much shorter time scale (e.g., 1 picosecond or less) than the reference clock cycle, while the stepping of the first and second accumulators happens on a nanosecond time scale.

The first and second phase accumulators calculate and keep track of the phase shifts for each reference clock cycle for the first and second DDS circuits. At a frequency transition, the programmable gate detects passing of the first phase angle past zero and generates the phase translation trigger pulse that coincide with the last clock cycle of the reference clock immediately before the second phase angle passes past zero. Required changes in the first phase output and the second phase output are calculated for each frequency transition by the first state machine and the second state machine, and loaded into the first phase accumulator and the second phase accumulator as the first phase offset word input and the second phase offset word input, respectively. Each time period having a defined frequency for the first and second DDS circuits begins and ends approximately when the second phase angle crosses zero, or more precisely, at the last possible cycle of the reference clock before the second phase angle crosses zero. The calculations and/or adjustments for the first phase offset word input and the second phase offset word input are performed in real time. Alternately, the calculations and/or adjustments for the first phase offset word input and the second phase offset word input may be pre-calculated and stored in memory.

Figures 5A, 5B:
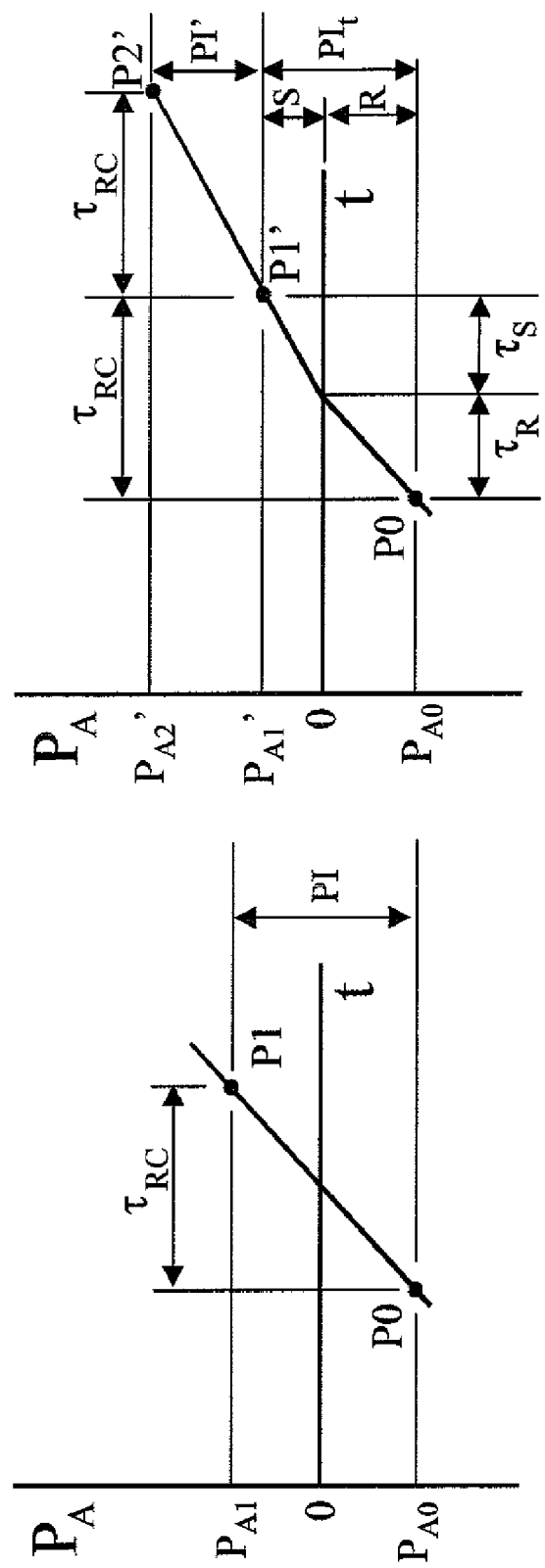
FIG. 5A is a graph of a time dependent phase output illustrating changes in a phase output of a first phase accumulator or a second phase accumulator in the absence of a frequency transition of first and second DDS circuits.
FIG. 5B is a graph of a time dependent phase output illustrating changes in the phase output of the second phase accumulator during a frequency transition of the second DDS circuit.

Referring to FIG. 5A, a graph of a time dependent phase output, which illustrates changes in a phase output of the first phase accumulator or the second phase accumulator in the absence of a frequency transition of first and second DDS circuits. The x-axis represents time, and the y-axis represents a phase output from the first phase accumulator or the second phase accumulator, i.e., the first phase output or the second phase output. The y-axis is thus on a scale of modulus, m, i.e., the y-axis wraps around at the value of m to zero. Thus, the numbers immediately below zero may represent a number shifted by the modulus, m. For example, a negative number a having a magnitude less than m on the y-axis represents a+m, which is between 0 and m. $\tau_{RC}$ is the period of the reference clock. P0 represents a point corresponding to a 0-th clock cycle, which is a reference point in time, and P1 represents a point corresponding to a first clock cycle, i.e., the next clock cycle after the 0-th clock cycle. PI is the phase increment between the 0-th clock cycle and the first clock cycle. PI is the numeric value of the frequency tuning word in the first phase accumulator or the second phase accumulator.

FIG. 5B is a graph of a time dependent phase output illustrating changes in the second phase output of the second phase accumulator during a frequency transition in the second DDS circuit. P0 represents a point corresponding to a 0-th clock cycle, which is a reference point in time. Here, P0 is selected to coincide with the phase translation trigger pulse generated from the programmable gate. Thus, P0 coincides with the last reference clock cycle of the second DDS circuit before the second phase output rolls over across zero. The value of the second phase output at the 0-th clock cycle is herein referred to as a 0-th phase output value $P_{A0}$. Noting that the y-axis scale is a scale of modulus m, and thus $P_{A0}$ is a positive integer less than m, the phase increment PI, which is equal to the numeric value of the frequency tuning word loaded in the second phase accumulator, is greater than m-$P_{A0}$. P1' represents a point corresponding to a first clock cycle, i.e., the next clock cycle after the 0-th clock cycle. P2' represents a point corresponding to a second clock cycle, i.e., the next clock cycle after the first clock cycle. A transitional phase increment, $PI_t$ is the phase increment between the 0-th clock cycle and the first clock cycle. PI' is the phase increment between the first clock cycle and the second clock cycle, which is equal to the numeric value of the new frequency tuning word loaded into the second phase accumulator provided by the second state machine as the frequency tuning word input.

The transitional phase increment, $PI_t$ is the sum of a residual phase increment R and a supplementary phase increment S. For the purposes of calculation of the transitional phase increment, Pt, the period of the reference clock $\tau_{RC}$ is divided into a residual time, $\tau_R$, and a supplementary time, $\tau_S$. The residual time, $\tau_R$, is the time from the 0-th clock cycle to the time needed for zero crossing at the same rate of phase increment prior to the frequency transition. The supplementary time, $\tau_S$ is the time from the zero crossing to the first clock cycle.

The residual phase increment R and the supplementary phase increment S are given by:

$$R = PI \times \tau_R/(\tau_S + \tau_R), \text{ and} \quad \text{(Equation 5.a)}$$

$$S = PI' \times \tau_S/(\tau_S + \tau_R). \quad \text{(Equation 5.b)}$$

The value of the second phase output at the first clock cycle is herein referred to as a first-clock-cycle phase output value $P_{A1}'$. The value of the second phase output at the second clock cycle is herein referred to as a second-clock-cycle phase output value $P_{A2}'$. Assuming that the positive integer, i, is equal to 1 for the purposes of description of the present invention, the first-clock-cycle phase output value $P_{A1}'$ is given by the supplementary phase increment S, and the second-clock-cycle phase output value $P_{A2}'$ is given by the sum of the supplementary phase increment S and PI', which is the numeric value of the new frequency tuning word loaded into the second phase accumulator.

Noting that $\tau_{RC}:\tau_R = PI:(m-P_{A0})$ and solving for the supplementary phase increment S, one obtains for the first-clock-cycle phase output value $P_{A1}'$ and for the second-clock-cycle phase output value $P_{A2}'$:

$$P_{A1}' = S = PI' \times (PI + P_{A0} - m)/PI \quad \text{(Equation 6.a)}$$

$$P_{A2}' = S + PI' = PI' \times (2PI + P_{A0} - m)/PI \quad \text{(Equation 6.b)}$$

In this case, the first-clock-cycle phase output value $P_{A1}'$ is loaded to the second phase accumulator as the second phase offset word input, and the second-clock-cycle phase output value $P_{A2}'$ is loaded to the first phase accumulator as the first phase offset word input concurrently with the loading of the frequency tuning word input.

In terms of phase angles, the first-clock-cycle phase angle $\phi_{A1}'$ corresponding to the first-clock-cycle phase output value $P_{A1}'$ and the second-clock-cycle phase angle $\phi_{A2}'$ corresponding to the second-clock-cycle phase output value $P_{A2}'$ are given by:

$$\phi_{A1}' = 2\pi \times PI' \times (PI + P_{A0} - m)/(PI \times m) \quad \text{(Equation 7.a)}$$

$$\phi_{A2}' = 2\pi \times PI' \times (2PI + P_{A0} - m)/(PI \times m) \quad \text{(Equation 7.b)}$$

For any arbitrary value for the positive integer, i, i.e., when the first phase output of the first DDS circuit runs ahead of the second phase output of the second DDS circuit by i number of reference clock cycles so that the phase difference prior to the frequency change is the product of the positive integer, i times the phase increment PI, the above equations may be generalized to calculate the first phase offset word input. Designating the value of the second phase output at the (i+1)-st clock cycle as an (i+1)-st clock-cycle phase output value $P_{A(i+1)}'$, and noting that the second phase offset word input is the same and the first phase offset word input needs to be greater than the second phase offset word input by the product of the positive integer, i times the new phase increment PI', one obtains for the first-clock-cycle phase output value $P_{A1}'$ and for the (i+1)-st clock-cycle phase output value $P_{A(i+1)}'$:

$$P_{A1}' = S = PI' \times (PI + P_{A0} - m)/PI \quad \text{(Equation 8.a)}$$

$$P_{A(i+1)}' = S + i \times PI' = PI' \times [\{(i+1) \times PI\} + P_{A0} - m]/PI \quad \text{(Equation 8.b)}$$

In this case, the first-clock-cycle phase output value $P_{A1}'$ is loaded to the second phase accumulator as the second phase offset word input, and the (i+1)-st clock-cycle phase output value $P_{A(i+1)}'$ is loaded to the first phase accumulator as the first phase offset word input concurrently with the loading of the frequency tuning word input.

The first phase offset word input is greater than the second phase offset word input by the positive integer, i, times the numeric value of the frequency tuning word input. The first phase offset word input has a phase, which is the (i+1)-st clock-cycle phase output value $P_{A(i+1)}'$, in modulo counting based on the modulus, m. The second phase offset word input has another phase, which is the first-clock-cycle phase output value $P_{A1}'$, in modulo counting based on the modulus, m. The first phase offset word input and the second phase offset word input may be calculated within the positive integer, i, number of reference clock cycles. In an embodiment, the positive integer, i, may be one and the first phase offset word input and the second phase offset word input may be calculated within one reference clock cycle.

The first-clock-cycle phase output value $P_{A1}'$ and the (i+1)-st clock-cycle phase output value $P_{A(i+1)}'$ in Equations 8.a and 8.b may be rewritten as:

$$P_{A1}' = PI' \times f1, \quad \text{(Equation 9.a)}$$

$$P_{A(i+1)}' = S + i \times PI' = PI' \times (i + f1), \text{ and} \quad \text{(Equation 9.b)}$$

$$f1 = (PI + P_{A0} - m)/PI. \quad \text{(Equation 9.c)}$$

The value, or the phase of the first phase offset word input, which is the (i+1)-st clock-cycle phase output value $P_{A(i+1)}'$ (i.e., the phase output value at the (i+1)-st clock cycle), is thus a product of a numeric value of the frequency tuning word input, represented by the new phase increment PI', and a sum of the positive integer, i, and a fractional number, f1. The fractional number f1 has a numerator of a sum of the second phase output, which is represented by the 0-th phase output value $P_{A0}$ since the calculation occurs based on the actual or anticipated generation of the phase translation trigger pulse, and a numeric value of the frequency tuning word, which is represented by the phase increment PI, less the modulus, m. The denominator of the fractional number f1 is the numeric value of the frequency tuning word, which is represented by the phase increment PI.

The value, or the phase of the second phase offset word input, which is the first-clock-cycle phase output value $P_1'$, is a product of a numeric value of the frequency tuning word input, represented by the new phase increment PI', and the fractional number, f1.

Further, the transitional phase increment $PI_t$ is the sum of the first-clock-cycle phase output value $P_1'$ (i.e., the phase output value at the first clock cycle) and the difference between the modulus, m, and the value of the 0-th phase output value $P_{A0}$, which is the second phase output at the frequency transition time $t_0$. Thus, the first phase offset word input is given by modulo addition based on modulus m of the second phase output, represented by the 0-th phase output value $P_{A0}$, and a total phase increment. The total phase increment is defined as the sum of a first phase increment from $P_{A0}$ to zero in modular addition based on modulus m, and a second phase increment from zero to the first-clock-cycle phase output value $P_{A(i+1)}'$. The first phase increment is a difference, i.e., the difference between the modulo, m and a value of the second phase output, which is the 0-th phase output value $P_{A0}$. The second phase increment is a product, represented by the first-clock-cycle phase output value $P_{A(i+1)}'$. As described above, the (i+1)-st clock-cycle phase output value $P_{A(i+1)}'$, is a product of a numeric value of the frequency tuning word input, represented by the new phase increment PI', and a sum of the positive integer, i, and a fractional number, f1.

The second phase offset word input is given by modulo addition based on modulus m of the second phase output, represented by the 0-th phase output value $P_{A0}$, and a second phase increment, which is the sum of the transitional phase increment $PI_t$. The transitional phase increment $PI_t$ is given by a sum of a difference, which is the difference between the modulo, m and a value of the second phase output, i.e., the 0-th phase output value $P_{A0}$, and a product, represented by the first-clock-cycle phase output value $P_1'$. As described above, the first-clock-cycle phase output value $P_1'$ is a product of a numeric value of the frequency tuning word input, represented by the new phase increment PI', and a fractional number, f1.

Subtraction of Equation 9.a from Equation 9.b yields:

$$P_{A(i+1)}' - P_{A1}' = PI' \times i. \quad \text{(Equation 10)}$$

In other words, the second phase offset word input is greater than the first phase offset word input by a product of a numeric value of the frequency tuning word input, represented by the new phase increment PI', and the positive integer, i, in modulo addition based on modulus m.

The phase offset inputs may also be defined as an angle formed by first n points of a phase wheel having equally spaced m points, each having a phase angle of $2\pi \times k/m$ in which k is 0 or a positive integer less than m, using new frequency starting at a phase angle of zero. Further, the above solutions may be modified to account for the cases of lower resolution of phase offset word inputs. For example, current DDS technology puts the phase offset word resolution at 14 bits. In such a case, the phase offset word inputs may be calculated to match the resolution of the new phase offset word. Further, the phase values of the first phase offset word input and the second phase offset word input need not be exactly equal to the phase angle. The phase values of the first phase offset word input and the second phase offset word input are obtained by multiplying $2\pi/m$ to the numeric values of the first phase offset word input and the second phase offset word input. However, the error approaches zero if the phase values of the first phase offset word input and the second phase offset word input are arbitrary close to the phase angle but less than the exact value. Moreover, any measurable or accountable additional delays may also be compensated for by adding an adjustment to the phase differential.

Figures 6A, 6B:
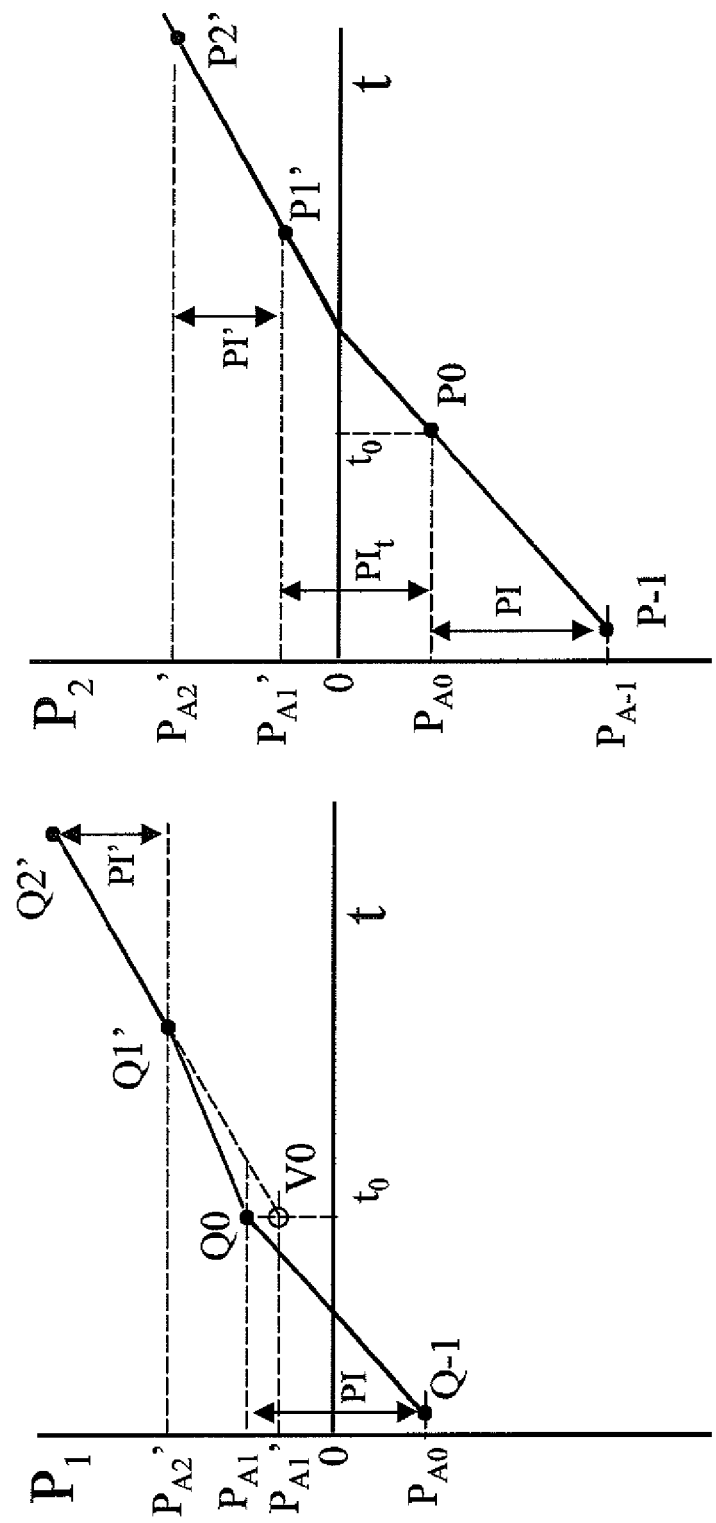
FIG. 6A is a graph of an exemplary first phase output at a frequency transition at $t_0$.
FIG. 6B is a graph of a corresponding exemplary second phase output at the frequency transition at $t_0$.

FIG. 6A is a graph of an exemplary first phase output at a frequency transition at $t_0$, and FIG. 6B is a graph of a corresponding exemplary second phase output at the frequency transition at $t_0$. For the purposes of description of the present invention, the positive integer, i, is set to be 1 in this case.

In FIG. 6A, Q0 represents a point corresponding to the beginning of a 0-th clock cycle coinciding with the frequency transition time $t_0$. The phase translation trigger pulse is generated from the programmable gate and applied to the first phase accumulator, the second phase accumulator, the first state machine, and the second state machine within the 0-th clock cycle so that the first phase offset word input and the second phase offset word input are transmitted to the first phase accumulator and the second phase accumulator for loading at the next reference clock cycle, or a "first clock cycle." Q1' represents a point corresponding to the beginning of the first clock cycle, and Q2' represent a point corresponding to the beginning of the second clock cycle. Q-1 represent a point corresponding to the beginning of the clock cycle immediately preceding the 0-th clock cycle, or a (−1)-st clock cycle.

In FIG. 6B, P0 represents a point corresponding to the beginning of a 0-th clock cycle coinciding with the frequency transition time $t_0$. P1 represents a point corresponding to the beginning of the first clock cycle, and P2' represent a point corresponding to the beginning of the second clock cycle. P-1 represent a point corresponding to the beginning of the clock cycle immediately preceding the 0-th clock cycle, or a (−1)-st clock cycle. The designations of names for the points in FIG. 6B match the designation of names for the points in FIG. 5B. The timing on the x-axis of the graph in FIG. 6B match the timing of on the x-axis of the graph in FIG. 6A.

The graph of the exemplary second phase output in FIG. 6B follows the pattern shown in FIG. 5B. In addition, the point P-1 shows the second phase output prior to the frequency transition at the frequency transition time $t_0$. The graph of the exemplary first phase output in FIG. 6A shows that the first phase accumulator overshoots past zero in modulo counting. Upon detection of this overshoot in modulo counting by the first high speed comparator, and as manifested by the square wave signal provided to the programmable gate triggers generation of the phase translation trigger pulse and subsequent loading of the first phase offset word input into the first phase accumulator and the second phase offset word input into the second phase accumulator as well as the frequency tuning word input, having the value of the new frequency tuning word input, into both phase accumulators. The newly loaded values of the first phase offset word input, the second phase offset word input, and the frequency tuning word input are effective as of the beginning of the first clock cycle. The newly loaded values may be calculated upon generation of the phase translation trigger pulse, or alternately, prior to the generation of the phase translation trigger pulse in anticipation of the frequency transition yet to occur.

The graph of the exemplary first phase output in FIG. 6A and the graph of the exemplary second phase output in FIG. 6B overlap upon lateral translation by one clock cycle except for the points representing Q0 and P1'. The point P2' overlaps with the point Q1', and the point P0 overlaps with the point Q-1. Upon lateral expansion of the graph of the exemplary first phase output in FIG. 6A and the graph of the exemplary second phase output in FIG. 6B, each of other points overlap with a corresponding point in the other graph except for the pair of the point Q0 and P1'. A virtual point in the graph of the exemplary first phase output in FIG. 6A that corresponds to the point P1' is marked with the label V0. The reason the point Q0 does not match the point P1' upon a lateral shift of the graph, which corresponds to a temporal shift, is because the overshoot of the first phase output past zero in the old frequency is needed to generate a change in sign in the square waveform signal at the first high speed comparator.

As demonstrated above, the first phase offset word input and the second phase offset word input may be precisely calculated for each frequency transition. Further, such calculations may be performed at any cycle of the output of the first and second DDS circuits, i.e., the frequency-tunable first DDS output and the frequency-tunable second DDS output in anticipation of a pending frequency transition. Current field programmable gate array technology can easily keep up with the output of the first and second DDS circuits. Thus, the waveforms and frequencies of the first and second DDS circuits may be changed at MHz rates.

Alternatively, one may use a very fast counter such as a very fast FPGA to count the reference clock cycles necessary before the zero crossing occurs. Another alternative is to provide a chip with two phase accumulators therein, in which one phase accumulator run an integer number of steps ahead of the other phase accumulator. In this case, only one phase look-up table is necessary.

Referring back to FIG. 3, the second DDS circuit outputs the frequency-tunable second DDS output signal, which is herein referred to as a "second digital output signal." The second digital output signal is transmitted to a second digital-to-analog converter (DAC), which converts the second digital output signal into a second analog output signal. The second analog output signal passes through a second low pass filter to remove high frequency noises. The signal that is output from the second low pass filter is herein referred to as a second filtered analog output signal. The second filtered analog output signal is then transmitted to a second high speed comparator. The output node of the second low pass filter, which is also the input node of the second high speed comparator, is herein designated as "node D."

Due to the removal of the high frequency components in the signal by the second low pass filter, the second filtered analog output signal provides a smooth frequency transition that always occurs at the zero crossing point in the sinusoidal wave. The frequency transition is jitterless, i.e., the frequency transition does not introduce other higher frequency signals than the frequencies present in the frequency-tunable second DDS output.

A reference voltage controller generates a digital reference voltage output, which is provided to a reference voltage digital-to-analog converter, which is represented as a third digital-to-analog converted in FIG. 3. The reference voltage digital-to-analog converter (DAC) receives the digital reference voltage output and generates an analog reference voltage. The analog reference voltage is transmitted to the second high speed comparator.

The second high speed comparator converts the second filtered analog output signal into a binary output that depends on the sign of the second filtered analog output. In other words, the second high speed comparator compares the second filtered analog output signal with the analog reference voltage, which may, or may not, be zero, and generates an output signal depending on the results of the comparison such that one voltage, e.g., a voltage corresponding to "1," is output when the second filtered analog output signal is higher than the analog reference voltage and another voltage, e.g., a voltage corresponding to "0," is output when the second filtered analog output signal is lower than the analog reference voltage. Thus, the output of the second high speed comparator is a binary output, i.e., an output having two states. Temporal extension of the binary output over a period of time constitutes a square waveform. The output node of the second high speed comparator is herein designated as "node E." The output signal from the second high speed comparator is herein referred to as a second square waveform output.

FIGS. 7A-7E provide a first set of exemplary signals at nodes A, B, C, D, and E, respectively, in the exemplary waveform generation circuit of FIG. 3. The exemplary signals are vertically aligned for time, i.e., the same value on the x-axis corresponds to the same time. Node A provides the first filtered analog output signal, which shows an overshoot of the first phase angle past zero at the frequency transition marked by an arrow. Node B provides the first square wave output having a 50% duty cycle. Node C provides the phase translation trigger pulse upon detection of the rising edge in the first square wave output at the frequency transition. Node D provides the second filtered analog output signal, which shows no overshoot of the second phase angle past zero at the frequency transition marked by another arrow. Due to the lack of any overshoot, the second filtered analog output signal has well defined periodicity at every cycle, and is thus "jitterless." Node E provides the second square wave output. In this particular example, the analog reference voltage is set at zero, and the second square wave output having a 50% duty cycle.

FIGS. 8A-8E provide a second set of exemplary signals at nodes A, B, C, D, and E, respectively, in the exemplary waveform generation circuit of FIG. 3. The exemplary signals are vertically aligned for time, i.e., the same value on the x-axis corresponds to the same time. Node A, node B, node C, and node D provide the same signal as in FIGS. 7A-7E. Node E provides the second square wave output. In this example, the analog reference voltage is set at a positive voltage, and the second square wave output having a duty cycle of less than 50%.

Referring back to FIG. 3, the second square waveform output from the second high speed comparator functions as a programmable clock signal of the exemplary waveform generation circuit, which is an arbitrary waveform generator capable of generating an arbitrary waveform. Normally, the square waveform output of the second high speed comparator has a 50% duty cycle. The second square waveform output of the second high speed comparator is used as a variable clock signal to create an arbitrary waveform having a period that is the same as a number N of clock cycles of the variable clock signal. The number N may be limited by the frequency of the frequency-tunable second DDS output.

The second square waveform output, which is the comparator output signal from the second high speed comparator, is transmitted to the programmable counter and a resampling flip flop. The programmable counter counts the number of pulses in the second square waveform output up to the number N of the clock cycles in the arbitrary waveform, i.e., the programmable counter performs modulo addition based on modulus, N. Preferably, the programming counter generates an enabling signal transmitted to the programmable gate only during the last cycle of the counting when the count on the programmable counter is highest, i.e., N−1, corresponding to the last clock cycle of the variable clock signal for the arbitrary waveform. The programmable counter and the resampling flip flop reduce the frequency jitter in the second square waveform output. The resampled second square waveform output, which is the output of the resampling flip flop, is applied to a random access memory (RAM) address controller as a variable clock signal. The resampled second square waveform output is a digital output signal having the same frequency as the comparator output signal and having reduced frequency jitter than the comparator output signal. The resampled second square waveform output has a square waveform having substantially the same duty cycle as the second square waveform output. The resampled second square waveform output may be provided as a square wave output for other circuits as a programmable clock signal.

The random address memory (RAM) address controller generates a cyclical output of RAM addresses. The number of RAM addresses in each cycle is the number N of the clock cycles in the arbitrary waveform. The RAM addresses from the RAM address controller go through a repetitive cycle, or a modular counting cycle, based on modulus N. The RAM addresses are transmitted to a random access memory (RAM), which outputs a digital RAM output signal corresponding to the RAM data stored at the accessed RAM address. Thus, N of the RAM addresses are accessed, and correspondingly, N of the data entries in the RAM are output as output data, which is herein referred to as digital RAM output signal. A segment and sequence controller configured to control the RAM may provide logic control of the RAM.

The sequence and the contents of the N accessed data entries determine the shape of the arbitrary waveform as normalized in a unit period of time. The frequency of the programmable clock signal, which is a variable clock signal, applied to the RAM affects the frequency of the arbitrary waveform. Specifically, the frequency of the arbitrary waveform is the frequency of the programmable clock signal, which is the frequency of the resampled second square waveform output divided by the number N of the clock cycles in the arbitrary waveform.

As an alternative, or in parallel with, the enabling signal generated from the programming counter, the RAM address controller may generate another enable signal to be transmitted to the programmable gate. This enable signal is generated only at a predefined address output to the programmable gate, in which the phase translation trigger pulse signal is generated only when that enable signal is provided. The predefined address output may be the address output corresponding to the last address output among the number N of the address outputs needed to generate the arbitrary waveform.

The digital RAM output signal is applied to an output digital-to-analog converter (DAC). The output DAC converts the digital RAM output signal into an analog output signal. The analog output signal may be a sinusoidal output signal or a non-sinusoidal output signal. Non-limiting exemplary non-sinusoidal output signals include a square waveform with any percentage of duty cycle between 0% and 100% and sawtooth waves.

The analog output signal may pass through another signal filter to remove high frequency noises. An analog waveform output is obtained from the output of the filter. The output node of the signal filter is herein referred to as "node F." The analog waveform output has an arbitrary waveform, which is the output signal of the waveform generator of the present invention.

Referring to FIGS. 7F and 8F, the output signal from node F of FIG. 3 is plotted with other signals from node A, node B, node C, node D, and node E for the exemplary case of a sawtooth waveform for the arbitrary waveform. FIG. 7F is vertically aligned for time with FIGS. 7A-7E, and FIG. 5F is vertically aligned for time with FIGS. 8A-8E.

The present invention may be implemented employing a field programmable gate array. Specifically, the first state machine, the second state machine, and the programmable gate may be implemented within a field programmable gate array. Further, the reference voltage controller, the programmable counter, and the segment and sequence controller for the random access memory may also be incorporated into the field programmable gate array. Preferably, the present invention is implemented as a single instrument unit that includes all of the components described in FIG. 3. However, implementation of the present invention as a collection of multiple units that are interconnected through wiring is contemplated herein also.

In case a high temporal resolution in a square waveform is not required, it is possible to use the directly synthesized square waveform from the first high frequency comparator because the triggering of the frequency change happens on the cycle of the reference clock. In either case, the first phase offset word input and the second phase offset word input are provided to the first and second phase accumulators after the frequency transition as provided in the formula above so that jitterless frequency transition is achieved in the square waveform from the second high speed comparator or the first high speed comparator.

Much flexibility is provided in generation of an arbitrary waveform by a precise change in the duty cycle of the square waveform output of the second high speed comparator. In this case a DAC can be used to change the threshold value of comparator that creates the square wave output to be nonzero. An example of the use of this modification is generation of a square waveform with a 52.5% duty cycle from ten cycles of the variable clock. The reference voltage controller and the third DAC may be used to set the threshold of the second high speed comparator to produce a square wave with a 25% duty cycle. Then the arbitrary waveform starts at a fixed high voltage at the rising edge of the first pulse of the resampled second square waveform output, and then goes to a fixed low voltage at the falling edge of the fifth clock pulse of the resampled second square waveform output thereby creating a square wave with a 52.5% duty cycle. Other more complicated scenarios are easily envisioned. A 14-bit DAC would provide excellent control of the duty cycle so that timing changes on the sub-microsecond can be accomplished, thereby providing much more flexibility in the production of the arbitrary waveforms. For example, precise control of the duty cycle is important in many applications for instrumentation including digital ion trap ion isolation.

The present invention enables remarkable level of control in frequency step resolution and reproducibility in arbitrary waveform generation. The temporal resolution of the arbitrary waveform is defined by the frequency jitter or reproducibility of individual adjustable clock cycles. Adding more clock cycles or increasing the adjustable clock frequency increases the temporal resolution of the arbitrary wave. For example, a square waveform produced with n clock cycles will have n times the temporal resolution of a single clock cycle. This resolution is extendable all the way down to the one hertz range or lower by adding more points to define the arbitrary waveform.

Large frequency changes or jumps may be jitterless by accessing separate waveforms in the programmable memory and/or the number of counts that define the arbitrary waveform. The present invention permits continuous scanning of the frequency of the arbitrary waveform, while maintaining high resolution and jitterless frequency transitions anywhere in the available frequency spectrum. The scanning capability of the waveform generator of the present invention is deemed to be better than the scanning capability currently available from the best commercially available 20 GHz waveform generators. Multiple DDS chips can be coupled to the same programmable clock signal. Pulses can be delivered with excellent delay resolution relative to each other because the multiple DDS chips have the same frequency jitter in phase with each other. The present invention enables high precision control for scientific measurements such as mass spectrometry, signal generation, timing and gating. The present invention is also suitable to communications applications.

Figure 9:
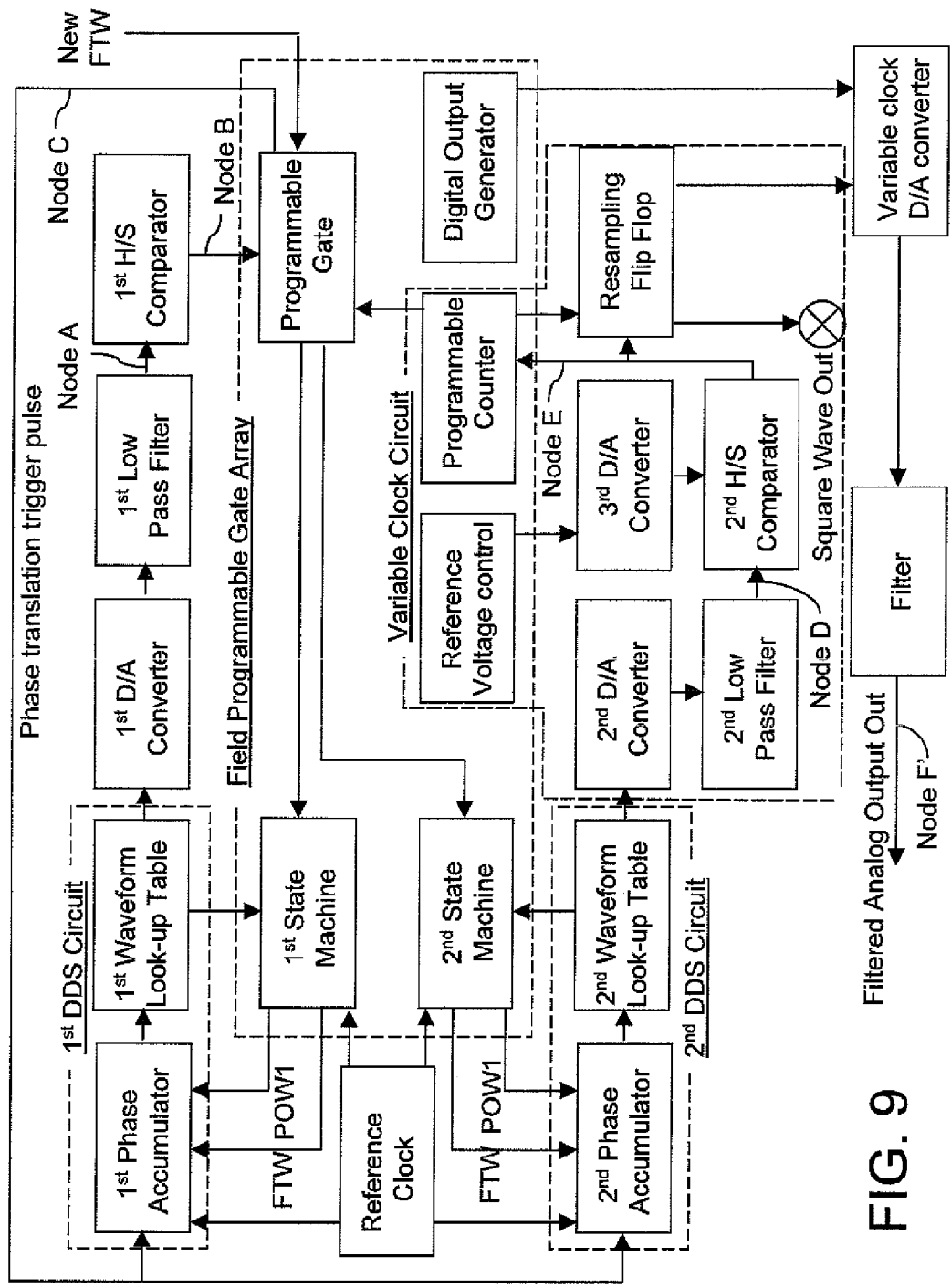
FIG. 9 is a circuit schematic for an exemplary variable clock digital-to-analog conversion circuit for a waveform generator according to another embodiment of the present invention. The exemplary variable clock digital-to-analog conversion circuit includes, among others, a first direct digital synthesis (DDS) circuit, a second DDS circuit, and a field programmable gate array (FPGA), and a variable clock digital-to-analog converter.

Referring to FIG. 9, an exemplary variable clock digital-to-analog conversion circuit for a waveform generator according to another embodiment of the present invention comprises a first direct digital synthesis (DDS) circuit, a second DDS circuit, a second digital-to-analog (D/A) converter, a second low pass filter, a second high speed comparator, a programmable counter, and a resampling flip flop as in the exemplary waveform generation circuit of FIG. 3.

The segment and sequence controller is replaced with a digital output generator, which may be any source capable of generating a digital signal. The digital output generator generates a multi-bit digital signal, e.g., a 14 bit digital signal. The digital output generator may be part of instrumentation for measurement and/or control. The digital output generator may also be a piece of communication equipment. Optionally, the digital output generator may be incorporated into a field programmable gate array (FPGA).

The random access memory (RAM) address controller and the random access memory (RAM) in the exemplary waveform generation circuit of FIG. 3 is replaced with a variable clock digital-to-analog (D/A) converter, which converts the digital output signal provided by the digital output generator to an analog output signal.

The second digital-to-analog converter, the second low pass filter, the second high speed comparator, the reference voltage control circuit, the third digital-to-analog converter, the programmable counter, and the resampling flip flop collectively constitute a variable clock circuit, which generates a variable clock signal from the output of the second DDS circuit. The variable clock signal is the resampled second square waveform output, which is the output of the resampling flip flop. While the present invention is described with the programmable counter and the resampling flip flop, the use of the programmable counter and the resampling flip flop is optional, and embodiments in which the programmable counter and the resampling flip flop are omitted are explicitly contemplated herein. In such embodiment, the signal at node E is directly fed into the variable clock D/A converter.

The variable clock signal is applied to the variable clock D/A converter, which determines the sampling frequency of the digital output signal. The frequency at which the analog output from the variable clock D/A converter is adjusted is the same as the frequency of the resampled second square waveform output, which may be varied by changing the value of the frequency tuning word of the first DDS circuit and the second DDS circuit. Thus, the resampled second square waveform output functions as a clock signal capable of changing frequency, or a variable clock. Highly accurate and variable clock frequency is provided to the variable clock D/A converter by the resampling flip flop.

The analog output signal may pass through another signal filter to remove high frequency noises. A filtered analog output signal is obtained from the output of the filter. The output node of the signal filter is herein referred to as "node F'." The filtered analog output signal has an analog signal, of which the frequency of sampling is determined by the frequency of the resampled second square waveform output derived from the first and second DDS circuits and the circuit elements connected thereto.

FIGS. 10A, 10B, 10C, 10D, 10E, and 10F show a third set of exemplary signals in the exemplary variable clock digital-to-analog conversion circuit of FIG. 9. Each of FIGS. 10A, 10B, 10C, 10D, 10E, and 10F corresponds to an exemplary signal at nodes A, B, C, D, E, and F', respectively. FIGS. 10A, 10B, 10C, 10D, 10E, and 10F are vertically aligned for time, i.e., the same value on the x-axis corresponds to the same time. The frequency of change in the signal at node F' is the sampling frequency of the exemplary variable clock digital-to-analog conversion circuit of FIG. 9, which is the same as the frequency of the signal at node E, i.e., the frequency of the second square waveform output.

The same level of frequency control is enabled in the exemplary variable clock digital-to-analog conversion circuit as in the exemplary waveform generation circuit. Consequently, the benefits of the exemplary waveform generation circuit described above are also replicated in the exemplary variable clock digital-to-analog conversion circuit.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A waveform generator comprising:
   a first direct digital synthesis (DDS) circuit comprising a first phase accumulator and a first waveform look-up table that generates a frequency-tunable first DDS output based on a first phase output from said first phase accumulator;
   a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;

a first state machine providing a frequency tuning word input and a first phase offset word input to said first phase accumulator at a frequency transition of said frequency-tunable first DDS output signal;

a second state machine providing said frequency tuning word input and a second phase offset word input to said second phase accumulator at a frequency transition of said frequency-tunable second DDS output signal; and a reference clock providing a reference clock signal to said first phase accumulator, said second phase accumulator, said first state machine, and said second state machine.

2. The waveform generator of claim 1, wherein a frequency of said frequency-tunable first DDS output signal is a product of a frequency of said reference clock and a numeric value of said frequency tuning word divided by said modulus.

3. The waveform generator of claim 1, wherein said first state machine and said second state machine are configured to provide said frequency transition of said frequency-tunable first DDS output signal and said frequency transition of said frequency-tunable second DDS output signal simultaneously.

4. The waveform generator of claim 1, wherein said first phase offset word input is greater than said second phase offset word input by said positive integer times a numeric value of said frequency tuning word input, and wherein said first phase offset word input has a third phase in modulo counting based on said modulus and said second phase offset word input has a fourth phase in modulo counting based on said modulus.

5. The waveform generator of claim 1, wherein said positive integer is 1.

6. The waveform generator of claim 1, wherein said modulus is $2^B$, wherein B is an integer between 31 and 49.

7. The waveform generator of claim 1, further comprising a random address memory (RAM) address controller generating a cyclical output of RAM addresses.

8. The waveform generator of claim 7, further comprising a random access memory (RAM) to which said RAM addressed is output, wherein said RAM outputs a digital RAM output signal.

9. The waveform generator of claim 8, further comprising an output digital-to-analog converter (DAC) to which said digital RAM output signal is supplied, wherein said output DAC converts said digital RAM output signal into an analog output signal.

10. The waveform generator of claim 9, wherein said analog output signal is a sinusoidal output signal or a non-sinusoidal output signal.

11. The waveform generator of claim 8, further comprising a segment and sequence controller configured to control said RAM.

12. The waveform generator of claim 1, wherein said frequency-tunable first DDS output signal and said frequency-tunable second DDS output signal are sinusoidal signals.

13. The waveform generator of claim 1, further comprising:

a first digital-to-analog converter (DAC) receiving said frequency-tunable first DDS output and generating a first analog output signal; and a first low pass filter receiving said first analog output signal and generating a first filtered analog output signal.

14. The waveform generator of claim 13, further comprising a first high speed comparator which converts said first filtered analog output signal into a binary output that depends on a sign of said first filtered analog output and transmits said binary output to a programmable gate.

15. A waveform generator comprising:

a first direct digital synthesis (DDS) circuit comprising a first phase accumulator and a first waveform look-up table that generates a frequency-tunable first DDS output based on a first phase output from said first phase accumulator;

a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;

a first state machine providing a frequency tuning word input and a first phase offset word input to said first phase accumulator at a frequency transition of said frequency-tunable first DDS output signal;

a second state machine providing said frequency tuning word input and a second phase offset word input to said second phase accumulator at a frequency transition of said frequency-tunable second DDS output signal; and a programmable gate that generates a phase translation trigger pulse signal at said frequency transition of said frequency-tunable first DOS output signal.

16. The waveform generator of claim 15, wherein said phase translation trigger pulse signal is routed to said first phase accumulator and said second phase accumulator, and wherein said frequency tuning word input and said first phase offset word input are loaded into said first phase accumulator, and wherein said frequency tuning word input and said second phase offset word input are loaded into said first phase accumulator.

17. The waveform generator of claim 15, wherein said phase translation trigger pulse signal is routed to said first state machine and said second state machine, and wherein said first state machine calculates said first phase offset word input and said second state machine calculates said second phase offset word input.

18. The waveform generator of claim 17, wherein said first phase offset word input and said second phase offset word input are calculated within one reference clock cycle.

19. The waveform generator of claim 15, wherein a difference between said first phase and said second phase and a signal delay time between said first phase output and said phase translation trigger pulse signal are set so that a difference between said modulus and said second phase is less than a value of said frequency tuning word when said phase translation trigger pulse signal is routed to said second state machine.

20. The waveform generator of claim 19, wherein said frequency tuning word input has a numeric value equal to a product of a new frequency for said frequency-tunable first DDS output signal and said modulus divided by a reference clock frequency applied to said first DDS circuit and said second DDS circuit.

21. The waveform generator of claim 19, wherein said first phase offset word input is given by modulo addition based on said modulus of said second phase output and a first phase increment, wherein said first phase increment is given by a sum of a difference and a first product, said difference being a difference between said modulus and a value of said second phase output and said first product being a product of a numeric value of said frequency tuning word input and a sum of said positive integer and a fractional number, wherein said fractional number has a numerator of a sum of said second phase output and a numeric value of said frequency tuning word less said modulus and said denominator is said numeric value of said frequency tuning word.

22. The waveform generator of claim 19, wherein said second phase offset word input is given by modulo addition based on said modulus of said second phase output and a second phase increment, wherein said second phase increment is given by a sum of a difference and a second product, said difference being a difference between said modulus and a value of said second phase output and said second product being a product of a numeric value of said frequency tuning word input and a fractional number, wherein said fractional number has a numerator of a sum of said second phase output and a numeric value of said frequency tuning word less said modulus and said denominator is said numeric value of said frequency tuning word.

23. The waveform generator of claim 19, wherein said second phase offset word input is greater than said first phase offset word input by a product of a numeric value of said frequency tuning word input and said positive integer in modulo addition based on said modulus.

24. The waveform generator of claim 15, further comprising a random address controller providing an enable signal only at a predefined address output to said programmable gate, wherein said phase translation trigger pulse signal is generated only when said enable signal is provided.

25. The waveform generator of claim 15, wherein said programmable gate comprises a new frequency tuning word input node to which a new frequency tuning word is applied, wherein said programmable gate generates said phase translation trigger pulse signal only if said new frequency tuning word and said frequency tuning word are different, and wherein said new frequency tuning word is provided to said first state machine and said second state machine so that said frequency tuning word input is the same as said new frequency tuning word.

26. A waveform generator comprising:
a first direct digital synthesis (DDS) circuit comprising a first phase accumulator and a first waveform look-up table that generates a frequency-tunable first DDS output based on a first phase output from said first phase accumulator; and
a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;
a digital-to-analog converter (DAC) receiving said frequency-tunable second DDS output and generating an analog output signal;
a low pass filter receiving said analog output signal and generating a filtered analog output signal;
a reference voltage controller that generates a digital reference voltage output;
a reference voltage digital-to-analog converter (DAC) that receives said digital reference voltage output and generates an analog reference voltage; and
a high speed comparator which compares said filtered analog output signal and said analog reference voltage and generates a comparator output signal.

27. The waveform generator of claim 26, further comprising a programmable counter and a resampling flip flop, wherein said comparator output signal is applied to said programmable counter and said resampling flip flop, and said resampling flip flop generates a digital output signal having a same frequency as said comparator output signal and having reduced frequency jitter than said comparator output signal.

28. A waveform generator comprising:
a first direct digital synthesis (DDS) circuit comprising a first phase accumulator and a first waveform look-up table that generates a frequency-tunable first DDS output based on a first phase output from said first phase accumulator; and
a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;
a field programmable gate array (FPGA), wherein said FPGA comprises:
a first state machine providing a frequency tuning word input and a first phase offset word input to said first phase accumulator at a frequency transition of said frequency-tunable first DDS output signal; and
a second state machine providing said frequency tuning word input and a second phase offset word input to said second phase accumulator at a frequency transition of said frequency-tunable second DDS output signal.

29. The waveform generator of claim 28, wherein said FPGA further comprises a programmable gate that generates a phase translation trigger pulse signal at said frequency transition of said frequency-tunable first DDS output signal.

30. The waveform generator of claim 28, further comprising:
a digital-to-analog converter (DAC) receiving said frequency-tunable second DDS output and generating an analog output signal;
a low pass filter receiving said analog output signal and generating a filtered analog output signal; a reference voltage controller that generates a digital reference voltage output;
a reference voltage digital-to-analog converter (DAC) that receives said digital reference voltage output and generates an analog reference voltage; and a high speed comparator which compares said filtered analog output signal and said analog reference voltage and generates a comparator output signal.

31. The waveform generator of claim 30, wherein said FPGA further comprises a programmable counter, and said waveform generator further comprises a resampling flip flop, wherein said comparator output signal is applied to said programmable counter and said resampling flip flop, and said resampling flip flop generates a digital output signal having a same frequency as said comparator output signal and having reduced frequency jitter than said comparator output signal.

32. A variable clock digital-to-analog conversion circuit comprising:
   a first direct digital synthesis (DDS) circuit comprising a first phase accumulator and a first waveform look-up table that generates a frequency-tunable first DDS output based on a first phase output from said first phase accumulator;
   a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;
   a variable clock circuit that receives said frequency-tunable second DDS output signal and generates a square waveform output having the same frequency as said frequency-tunable second DDS output signal;
   a digital-to-analog converter (DAC) receiving said frequency-tunable second DDS output and generating an analog output signal;
   a low pass filter receiving said analog output signal and generating a filtered analog output signal;
   a reference voltage controller that generates a digital reference voltage output;
   a reference voltage digital-to-analog converter (DAC) that receives said digital reference voltage output and generates an analog reference voltage; and
   a high speed comparator which compares said filtered analog output signal and said analog reference voltage and generates a comparator output signal.

33. The variable clock digital-to-analog conversion circuit of claim 32, further comprising:
   another digital-to-analog converter (DAC) receiving said frequency-tunable first DDS output and generating another analog output signal;
   another low pass filter receiving said another analog output signal and generating another filtered analog output signal.

34. The variable clock digital-to-analog conversion circuit of claim 32, further comprising a programmable counter and a resampling flip flop, wherein said comparator output signal is applied to said programmable counter and said resampling flip flop, and said resampling flip flop generates a digital output signal having a same frequency as said comparator output signal and having reduced frequency jitter than said comparator output signal.

35. The variable clock digital-to-analog conversion circuit of claim 32, wherein a first state machine and a second state machine are configured to provide said frequency transition of said frequency-tunable first DDS output signal and said frequency transition of said frequency-tunable second DDS output signal simultaneously.

36. The variable clock digital-to-analog conversion circuit of claim 32, wherein said FPGA further comprises: a digital output generator that generates a digital output signal; and a variable clock digital-to-analog converter receiving said square waveform output as a clock input signal and said digital output signal as data input signal and generating an analog output at a frequency of said square waveform output.

37. A variable clock digital-to-analog conversion circuit comprising:
   a first direct digital synthesis (DDS) circuit comprising a first phase accumulator and a first waveform look-up table that generates a frequency-tunable first DDS output based on a first phase output from said first phase accumulator;
   a second direct digital synthesis circuit comprising a second phase accumulator and a second waveform look-up table that generates a frequency-tunable second DDS output signal based on a second phase output from said second phase accumulator, wherein said frequency-tunable second DDS output signal has the same frequency as said frequency-tunable first DDS output signal, wherein said first waveform look-up table and said second waveform look-up table have same data contents, wherein said first phase output has a first phase in modulo counting based on a modulus and said second phase has a second phase in modulo counting based on said modulus, and wherein said first phase is ahead of said second phase by positive integer times a frequency tuning word that is commonly employed by said first phase accumulator and said second phase accumulator;
   a variable clock circuit that receives said frequency-tunable second DDS output signal and generates a square waveform output having the same frequency as said frequency-tunable second DDS output signal; and
   a field programmable gate array (FPGA), wherein said FPGA comprises:
      a first state machine providing a frequency tuning word input and a first phase offset word input to said first phase accumulator at a frequency transition of said frequency-tunable first DDS output signal; and
      a second state machine providing said frequency tuning word input and a second phase offset word input to said second phase accumulator at a frequency transition of said frequency-tunable second DDS output signal.

38. The variable clock digital-to-analog conversion circuit of claim 37, wherein said FPGA further comprises: a programmable gate that generates a phase translation trigger pulse signal at said frequency transition of said frequency-tunable first DDS output signal.

39. The variable clock digital-to-analog conversion circuit of claim 37, wherein said FPGA further comprises: a digital-to-analog converter (DAC) receiving said second frequency-tunable second DDS output and generating an analog output signal; a low pass filter receiving said first analog output signal and generating a filtered analog output signal; a reference voltage digital-to-analog converter (DAC) that receives a digital reference voltage output and generates said analog reference voltage; a high speed comparator which compares said filtered analog output signal and analog reference voltage and generates a comparator output signal; and a reference voltage controller that generates a digital reference voltage output.

* * * * *